(12) United States Patent
Albertson et al.

(10) Patent No.: US 9,009,827 B1
(45) Date of Patent: Apr. 14, 2015

(54) SECURITY SHARING SYSTEM

(71) Applicant: Palantir Technologies Inc., Palo Alto, CA (US)

(72) Inventors: Jacob Albertson, New York, NY (US); Melody Hildebrandt, New York, NY (US); Harkirat Singh, New York, NY (US); Shyam Sankar, Palo Alto, CA (US); Rick Ducott, San Francisco, CA (US); Peter Maag, New York, NY (US); Marissa Kimball, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 14/280,490

(22) Filed: May 16, 2014

Related U.S. Application Data

(60) Provisional application No. 61/942,480, filed on Feb. 20, 2014.

(51) Int. Cl.
*H04L 29/06* (2006.01)

(52) U.S. Cl.
CPC ...................................... *H04L 63/14* (2013.01)

(58) Field of Classification Search
None
See application file for complete search history.

(56) References Cited

U.S. PATENT DOCUMENTS

| | | | |
|---|---|---|---|
| 5,329,108 A | 7/1994 | Lamoure | |
| 5,548,749 A | 8/1996 | Kroenke et al. | |
| 5,632,009 A | 5/1997 | Rao et al. | |
| 5,670,987 A | 9/1997 | Doi et al. | |
| 5,708,828 A | 1/1998 | Coleman | |
| 5,765,171 A | 6/1998 | Gehani et al. | |
| 5,845,300 A | 12/1998 | Comer | |
| 5,870,761 A | 2/1999 | Demers et al. | |
| 6,057,757 A | 5/2000 | Arrowsmith et al. | |
| 6,098,078 A | 8/2000 | Gehani et al. | |
| 6,161,098 A | 12/2000 | Wallman | |
| 6,190,053 B1 | 2/2001 | Stahlecker et al. | |
| 6,202,085 B1 | 3/2001 | Benson et al. | |
| 6,216,140 B1 | 4/2001 | Kramer | |
| 6,219,053 B1 | 4/2001 | Tachibana et al. | |
| 6,232,971 B1 | 5/2001 | Haynes | |
| 6,247,019 B1 | 6/2001 | Davies | |
| 6,279,018 B1 | 8/2001 | Kudrolli et al. | |

(Continued)

FOREIGN PATENT DOCUMENTS

| | | |
|---|---|---|
| CN | 101729531 | 6/2010 |
| CN | 103281301 | 9/2013 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — William Goodchild
(74) *Attorney, Agent, or Firm* — Knobbe, Martens, Olson & Bear, LLP

(57) ABSTRACT

Systems and techniques for sharing security data are described herein. Security rules and/or attack data may be automatically shared, investigated, enabled, and/or used by entities. A security rule may be enabled on different entities comprising different computing systems to combat similar security threats and/or attacks. Security rules and/or attack data may be modified to redact sensitive information and/or configured through access controls for sharing.

20 Claims, 14 Drawing Sheets

(56) References Cited

U.S. PATENT DOCUMENTS

| | | |
|---|---|---|
| 6,289,338 B1 | 9/2001 | Stoffel et al. |
| 6,317,754 B1 | 11/2001 | Peng |
| 6,341,310 B1 | 1/2002 | Leshem et al. |
| 6,369,835 B1 | 4/2002 | Lin |
| 6,374,252 B1 | 4/2002 | Althoff et al. |
| 6,463,404 B1 | 10/2002 | Appleby |
| 6,523,172 B1 | 2/2003 | Martinez-Guerra et al. |
| 6,539,381 B1 | 3/2003 | Prasad et al. |
| 6,549,944 B1 | 4/2003 | Weinberg et al. |
| 6,560,620 B1 | 5/2003 | Ching |
| 6,567,936 B1 | 5/2003 | Yang et al. |
| 6,581,068 B1 | 6/2003 | Bensoussan et al. |
| 6,631,496 B1 | 10/2003 | Li et al. |
| 6,640,231 B1 | 10/2003 | Andersen et al. |
| 6,714,936 B1 | 3/2004 | Nevin, III |
| 6,748,481 B1 | 6/2004 | Parry et al. |
| 6,775,675 B1 | 8/2004 | Nwabueze et al. |
| 6,807,569 B1 | 10/2004 | Bhimani et al. |
| 6,816,941 B1 | 11/2004 | Carlson et al. |
| 6,839,745 B1 | 1/2005 | Dingari et al. |
| 6,976,210 B1 | 12/2005 | Silva et al. |
| 6,985,950 B1 | 1/2006 | Hanson et al. |
| 7,027,974 B1 | 4/2006 | Busch et al. |
| 7,036,085 B2 | 4/2006 | Barros |
| 7,072,911 B1 | 7/2006 | Doman |
| 7,139,800 B2 | 11/2006 | Bellotti et al. |
| 7,158,878 B2 | 1/2007 | Rasmussen et al. |
| 7,167,877 B2 | 1/2007 | Balogh et al. |
| 7,171,427 B2 | 1/2007 | Witowski et al. |
| 7,237,192 B1 | 6/2007 | Stephenson et al. |
| 7,240,330 B2 | 7/2007 | Fairweather |
| 7,278,105 B1 | 10/2007 | Kitts |
| 7,373,669 B2 | 5/2008 | Eisen |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,437,664 B2 | 10/2008 | Borson |
| 7,451,397 B2 | 11/2008 | Weber et al. |
| 7,454,466 B2 | 11/2008 | Bellotti et al. |
| 7,467,375 B2 | 12/2008 | Tondreau et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,533,069 B2 | 5/2009 | Fairweather |
| 7,558,677 B2 | 7/2009 | Jones |
| 7,574,428 B2 | 8/2009 | Leiserowitz et al. |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,676,788 B1 | 3/2010 | Ousterhout et al. |
| 7,685,083 B2 | 3/2010 | Fairweather |
| 7,703,021 B1 | 4/2010 | Flam |
| 7,716,077 B1 | 5/2010 | Mikurak |
| 7,725,547 B2 | 5/2010 | Albertson et al. |
| 7,770,100 B2 | 8/2010 | Chamberlain et al. |
| 7,783,658 B1 | 8/2010 | Bayliss |
| 7,809,703 B2 | 10/2010 | Balabhadrapatruni et al. |
| 7,814,102 B2 | 10/2010 | Miller |
| 7,818,297 B2 | 10/2010 | Peleg et al. |
| 7,818,658 B2 | 10/2010 | Chen |
| 7,877,421 B2 | 1/2011 | Berger et al. |
| 7,894,984 B2 | 2/2011 | Rasmussen et al. |
| 7,920,963 B2 | 4/2011 | Jouline et al. |
| 7,962,281 B2 | 6/2011 | Rasmussen et al. |
| 7,962,495 B2 | 6/2011 | Jain et al. |
| 7,962,848 B2 | 6/2011 | Bertram |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,151 B2 | 9/2011 | Lier et al. |
| 8,015,487 B2 | 9/2011 | Roy et al. |
| 8,046,362 B2 | 10/2011 | Bayliss |
| 8,117,022 B2 | 2/2012 | Linker |
| 8,132,149 B2 | 3/2012 | Shenfield et al. |
| 8,135,679 B2 | 3/2012 | Bayliss |
| 8,135,719 B2 | 3/2012 | Bayliss |
| 8,145,703 B2 | 3/2012 | Frishert et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,239,668 B1 | 8/2012 | Chen et al. |
| 8,266,168 B2 | 9/2012 | Bayliss |
| 8,271,948 B2 | 9/2012 | Talozi et al. |
| 8,290,942 B2 | 10/2012 | Jones et al. |
| 8,290,990 B2 | 10/2012 | Drath et al. |
| 8,316,060 B1 | 11/2012 | Snyder et al. |
| 8,321,943 B1 | 11/2012 | Walters et al. |
| 8,347,398 B1 | 1/2013 | Weber |
| 8,368,695 B2 | 2/2013 | Howell et al. |
| 8,380,659 B2 | 2/2013 | Zunger |
| 8,397,171 B2 | 3/2013 | Klassen et al. |
| 8,412,707 B1 | 4/2013 | Mianji |
| 8,447,674 B2 | 5/2013 | Choudhuri et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,484,168 B2 | 7/2013 | Bayliss |
| 8,489,331 B2 | 7/2013 | Kopf et al. |
| 8,489,623 B2 | 7/2013 | Jain et al. |
| 8,489,641 B1 | 7/2013 | Seefeld et al. |
| 8,495,077 B2 | 7/2013 | Bayliss |
| 8,498,969 B2 | 7/2013 | Bayliss |
| 8,498,984 B1 | 7/2013 | Hwang et al. |
| 8,514,082 B2 | 8/2013 | Cova et al. |
| 8,515,207 B2 | 8/2013 | Chau |
| 8,515,912 B2 | 8/2013 | Garrod et al. |
| 8,527,461 B2 | 9/2013 | Ducott, III et al. |
| 8,554,579 B2 | 10/2013 | Tribble et al. |
| 8,577,911 B1 | 11/2013 | Stepinski et al. |
| 8,589,273 B2 | 11/2013 | Creeden et al. |
| 8,600,872 B1 | 12/2013 | Yan |
| 8,620,641 B2 | 12/2013 | Farnsworth et al. |
| 8,688,749 B1 | 4/2014 | Ducott, III et al. |
| 8,689,108 B1 | 4/2014 | Duffield et al. |
| 8,689,182 B2 | 4/2014 | Leithead et al. |
| 8,713,467 B1 | 4/2014 | Goldenberg et al. |
| 8,788,405 B1 | 7/2014 | Sprague et al. |
| 8,788,407 B1 | 7/2014 | Singh et al. |
| 8,799,799 B1 | 8/2014 | Cervelli et al. |
| 2001/0021936 A1 | 9/2001 | Bertram |
| 2002/0095658 A1 | 7/2002 | Shulman |
| 2002/0116120 A1 | 8/2002 | Ruiz et al. |
| 2002/0130907 A1 | 9/2002 | Chi et al. |
| 2002/0174201 A1 | 11/2002 | Ramer et al. |
| 2003/0084017 A1 | 5/2003 | Ordille |
| 2003/0088654 A1 | 5/2003 | Good et al. |
| 2003/0097330 A1 | 5/2003 | Hillmer et al. |
| 2003/0144868 A1 | 7/2003 | MacIntyre et al. |
| 2003/0172053 A1 | 9/2003 | Fairweather |
| 2003/0177112 A1 | 9/2003 | Gardner |
| 2003/0182313 A1 | 9/2003 | Federwisch et al. |
| 2003/0200217 A1 | 10/2003 | Ackerman |
| 2003/0225755 A1 | 12/2003 | Iwayama et al. |
| 2004/0083466 A1 | 4/2004 | Dapp et al. |
| 2004/0085318 A1 | 5/2004 | Hassler et al. |
| 2004/0095349 A1 | 5/2004 | Bito et al. |
| 2004/0103124 A1 | 5/2004 | Kupkova |
| 2004/0111390 A1 | 6/2004 | Saito et al. |
| 2004/0153418 A1 | 8/2004 | Hanweck |
| 2004/0181554 A1 | 9/2004 | Heckerman et al. |
| 2004/0205524 A1 | 10/2004 | Richter et al. |
| 2004/0250124 A1 | 12/2004 | Chesla et al. |
| 2005/0028094 A1 | 2/2005 | Allyn |
| 2005/0080769 A1 | 4/2005 | Gemmell |
| 2005/0086207 A1 | 4/2005 | Heuer et al. |
| 2005/0091420 A1 | 4/2005 | Snover et al. |
| 2005/0125715 A1 | 6/2005 | Di Franco et al. |
| 2005/0180330 A1 | 8/2005 | Shapiro |
| 2005/0182793 A1 | 8/2005 | Keenan et al. |
| 2005/0193024 A1 | 9/2005 | Beyer et al. |
| 2005/0229256 A2 | 10/2005 | Banzhof |

(56) References Cited

U.S. PATENT DOCUMENTS

| | | |
|---|---|---|
| 2005/0262556 A1 | 11/2005 | Waisman et al. |
| 2006/0026170 A1 | 2/2006 | Kreitler et al. |
| 2006/0045470 A1 | 3/2006 | Poslinski et al. |
| 2006/0069912 A1 | 3/2006 | Zheng et al. |
| 2006/0074866 A1 | 4/2006 | Chamberlain et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0155945 A1 | 7/2006 | McGarvey |
| 2006/0190497 A1 | 8/2006 | Inturi et al. |
| 2006/0206866 A1 | 9/2006 | Eldrige et al. |
| 2006/0265747 A1* | 11/2006 | Judge ............................ 726/22 |
| 2006/0271277 A1 | 11/2006 | Hu et al. |
| 2007/0005707 A1 | 1/2007 | Teodosiu et al. |
| 2007/0011150 A1 | 1/2007 | Frank |
| 2007/0016363 A1 | 1/2007 | Huang et al. |
| 2007/0026373 A1 | 2/2007 | Suriyanarayanan et al. |
| 2007/0074169 A1 | 3/2007 | Chess et al. |
| 2007/0078832 A1 | 4/2007 | Ott et al. |
| 2007/0078872 A1 | 4/2007 | Cohen |
| 2007/0112714 A1 | 5/2007 | Fairweather |
| 2007/0112887 A1 | 5/2007 | Liu et al. |
| 2007/0168516 A1 | 7/2007 | Liu et al. |
| 2007/0180075 A1 | 8/2007 | Chasman et al. |
| 2007/0192265 A1 | 8/2007 | Chopin et al. |
| 2007/0220067 A1 | 9/2007 | Suriyanarayanan et al. |
| 2007/0220328 A1 | 9/2007 | Liu et al. |
| 2007/0233756 A1 | 10/2007 | D'Souza et al. |
| 2007/0266336 A1 | 11/2007 | Nojima et al. |
| 2007/0294643 A1 | 12/2007 | Kyle |
| 2007/0294766 A1 | 12/2007 | Mir et al. |
| 2007/0299887 A1 | 12/2007 | Novik et al. |
| 2008/0027981 A1 | 1/2008 | Wahl |
| 2008/0033753 A1 | 2/2008 | Canda et al. |
| 2008/0040684 A1 | 2/2008 | Crump |
| 2008/0077597 A1 | 3/2008 | Butler |
| 2008/0077642 A1 | 3/2008 | Carbone et al. |
| 2008/0086718 A1 | 4/2008 | Bostick et al. |
| 2008/0104019 A1 | 5/2008 | Nath |
| 2008/0133567 A1 | 6/2008 | Ames et al. |
| 2008/0140387 A1 | 6/2008 | Linker |
| 2008/0195608 A1 | 8/2008 | Clover |
| 2008/0222295 A1 | 9/2008 | Robinson et al. |
| 2008/0228467 A1 | 9/2008 | Womack et al. |
| 2008/0229422 A1 | 9/2008 | Hudis et al. |
| 2008/0243951 A1 | 10/2008 | Webman et al. |
| 2008/0263468 A1 | 10/2008 | Cappione et al. |
| 2008/0278311 A1 | 11/2008 | Grange et al. |
| 2008/0281580 A1 | 11/2008 | Zabokritski |
| 2008/0288306 A1 | 11/2008 | MacIntyre et al. |
| 2008/0301643 A1 | 12/2008 | Appleton et al. |
| 2008/0320299 A1 | 12/2008 | Wobber et al. |
| 2009/0018940 A1 | 1/2009 | Wang et al. |
| 2009/0027418 A1 | 1/2009 | Maru et al. |
| 2009/0044279 A1 | 2/2009 | Crawford et al. |
| 2009/0076845 A1 | 3/2009 | Bellin et al. |
| 2009/0083184 A1 | 3/2009 | Eisen |
| 2009/0103442 A1 | 4/2009 | Douville |
| 2009/0132953 A1 | 5/2009 | Reed et al. |
| 2009/0144262 A1 | 6/2009 | White et al. |
| 2009/0164934 A1 | 6/2009 | Bhattiprolu et al. |
| 2009/0171939 A1 | 7/2009 | Athsani et al. |
| 2009/0192957 A1 | 7/2009 | Subramanian et al. |
| 2009/0199090 A1 | 8/2009 | Poston et al. |
| 2009/0222400 A1 | 9/2009 | Kupershmidt et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0328222 A1 | 12/2009 | Helman et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070897 A1 | 3/2010 | Aymeloglu et al. |
| 2010/0077481 A1* | 3/2010 | Polyakov et al. ............ 726/24 |
| 2010/0077483 A1 | 3/2010 | Stolfo et al. |
| 2010/0122152 A1 | 5/2010 | Chamberlain et al. |
| 2010/0125546 A1 | 5/2010 | Barrett et al. |
| 2010/0145909 A1 | 6/2010 | Ngo |
| 2010/0198684 A1 | 8/2010 | Eraker et al. |
| 2010/0199225 A1 | 8/2010 | Coleman et al. |
| 2010/0204983 A1 | 8/2010 | Chung et al. |
| 2010/0235915 A1 | 9/2010 | Memon et al. |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306029 A1 | 12/2010 | Jolley |
| 2010/0306285 A1 | 12/2010 | Shah et al. |
| 2010/0306713 A1 | 12/2010 | Geisner et al. |
| 2010/0321399 A1 | 12/2010 | Ellren et al. |
| 2010/0325581 A1 | 12/2010 | Finkelstein et al. |
| 2011/0010342 A1 | 1/2011 | Chen et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0087519 A1 | 4/2011 | Fordyce, III et al. |
| 2011/0167105 A1 | 7/2011 | Ramakrishnan et al. |
| 2011/0167493 A1 | 7/2011 | Song et al. |
| 2011/0170799 A1 | 7/2011 | Carrino et al. |
| 2011/0173093 A1 | 7/2011 | Psota et al. |
| 2011/0178842 A1 | 7/2011 | Rane et al. |
| 2011/0208724 A1 | 8/2011 | Jones et al. |
| 2011/0231223 A1 | 9/2011 | Winters |
| 2011/0238510 A1 | 9/2011 | Rowen et al. |
| 2011/0238570 A1 | 9/2011 | Li et al. |
| 2011/0258216 A1 | 10/2011 | Supakkul et al. |
| 2011/0291851 A1 | 12/2011 | Whisenant |
| 2011/0307382 A1 | 12/2011 | Siegel et al. |
| 2011/0310005 A1 | 12/2011 | Chen et al. |
| 2012/0005159 A1 | 1/2012 | Wang et al. |
| 2012/0019559 A1 | 1/2012 | Siler et al. |
| 2012/0036106 A1 | 2/2012 | Desai et al. |
| 2012/0036434 A1 | 2/2012 | Oberstein |
| 2012/0066296 A1 | 3/2012 | Appleton et al. |
| 2012/0079363 A1 | 3/2012 | Folting et al. |
| 2012/0084135 A1 | 4/2012 | Nissan et al. |
| 2012/0084866 A1 | 4/2012 | Stolfo |
| 2012/0110633 A1 | 5/2012 | An et al. |
| 2012/0110674 A1 | 5/2012 | Belani et al. |
| 2012/0144335 A1 | 6/2012 | Abeln et al. |
| 2012/0159307 A1 | 6/2012 | Chung et al. |
| 2012/0191446 A1 | 7/2012 | Binsztok et al. |
| 2012/0196558 A1 | 8/2012 | Reich et al. |
| 2012/0208636 A1 | 8/2012 | Feige |
| 2012/0215898 A1 | 8/2012 | Shah et al. |
| 2012/0221580 A1 | 8/2012 | Barney |
| 2012/0246148 A1 | 9/2012 | Dror |
| 2012/0290879 A1 | 11/2012 | Shibuya et al. |
| 2012/0304150 A1 | 11/2012 | Leithead et al. |
| 2012/0310831 A1 | 12/2012 | Harris et al. |
| 2012/0310838 A1 | 12/2012 | Harris et al. |
| 2012/0323888 A1 | 12/2012 | Osann, Jr. |
| 2012/0330973 A1 | 12/2012 | Ghuneim et al. |
| 2013/0019306 A1* | 1/2013 | Lagar-Cavilla et al. ........ 726/22 |
| 2013/0024307 A1 | 1/2013 | Fuerstenberg et al. |
| 2013/0024339 A1 | 1/2013 | Choudhuri et al. |
| 2013/0046842 A1 | 2/2013 | Muntz et al. |
| 2013/0061169 A1 | 3/2013 | Pearcy et al. |
| 2013/0067017 A1 | 3/2013 | Carriere et al. |
| 2013/0073377 A1 | 3/2013 | Heath |
| 2013/0091084 A1 | 4/2013 | Lee |
| 2013/0097482 A1 | 4/2013 | Marantz et al. |
| 2013/0124193 A1 | 5/2013 | Holmberg |
| 2013/0139268 A1 | 5/2013 | An et al. |
| 2013/0160120 A1 | 6/2013 | Malaviya et al. |
| 2013/0173540 A1 | 7/2013 | Qian et al. |
| 2013/0176321 A1 | 7/2013 | Mitchell et al. |
| 2013/0179420 A1 | 7/2013 | Park et al. |
| 2013/0191336 A1 | 7/2013 | Ducott et al. |
| 2013/0211985 A1 | 8/2013 | Clark et al. |
| 2013/0224696 A1 | 8/2013 | Wolfe et al. |
| 2013/0232045 A1 | 9/2013 | Tai et al. |
| 2013/0238616 A1 | 9/2013 | Rose et al. |
| 2013/0262527 A1 | 10/2013 | Hunter et al. |

(56) References Cited

U.S. PATENT DOCUMENTS

| | | | |
|---|---|---|---|
| 2013/0268520 | A1 | 10/2013 | Fisher et al. |
| 2013/0275446 | A1 | 10/2013 | Jain et al. |
| 2013/0282696 | A1 | 10/2013 | John et al. |
| 2013/0290011 | A1 | 10/2013 | Lynn et al. |
| 2013/0290825 | A1 | 10/2013 | Arndt et al. |
| 2013/0318594 | A1 | 11/2013 | Hoy et al. |
| 2013/0339218 | A1 | 12/2013 | Subramanian et al. |
| 2013/0346444 | A1 | 12/2013 | Makkar et al. |
| 2014/0006109 | A1 | 1/2014 | Callioni et al. |
| 2014/0019936 | A1 | 1/2014 | Cohanoff |
| 2014/0032506 | A1 | 1/2014 | Hoey et al. |
| 2014/0033010 | A1 | 1/2014 | Richardt et al. |
| 2014/0040182 | A1 | 2/2014 | Gilder et al. |
| 2014/0040714 | A1 | 2/2014 | Siegel et al. |
| 2014/0059683 | A1 | 2/2014 | Ashley |
| 2014/0068487 | A1 | 3/2014 | Steiger et al. |
| 2014/0108380 | A1 | 4/2014 | Gotz et al. |
| 2014/0108985 | A1 | 4/2014 | Scott et al. |
| 2014/0114972 | A1 | 4/2014 | Ducott et al. |
| 2014/0129518 | A1 | 5/2014 | Ducott et al. |
| 2014/0157172 | A1 | 6/2014 | Peery et al. |

FOREIGN PATENT DOCUMENTS

| | | |
|---|---|---|
| EP | 0 816 968 | 1/1996 |
| EP | 1 672 527 | 6/2006 |
| EP | 2 551 799 | 1/2013 |
| GB | 2 366 498 | 3/2002 |
| WO | WO 2005/104736 | 11/2005 |
| WO | WO 2008/011728 | 1/2008 |
| WO | WO 2008/064207 | 5/2008 |
| WO | WO 2009/061501 | 5/2009 |
| WO | WO 2010/030913 | 3/2010 |
| WO | WO 2011/071833 | 6/2011 |
| WO | WO 2011/161565 | 12/2011 |
| WO | WO 2012/009397 | 1/2012 |
| WO | WO 2013/126281 | 8/2013 |

OTHER PUBLICATIONS

Acklen, Laura, "Absolute Beginner's Guide to Microsoft Word 2003," Dec. 24, 2003, pp. 15-18, 34-41, 308-316.

Ananiev at al., "The New Modality API," http://web.archive.org/web/20061211011958/http://java.sun.com/developer/technicalArticles/J2SE/Desktop/javase6/modality/ Jan. 2006, pp. 8.

Anonymous, "BackTuIt—JD Edwards One World Version Control System," printed Jul. 23, 2007 in 1 page.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Geiger, Jonathan G., "Data Quality Management, The Most Critical Initiative You Can Implement," Data Warehousing, Management and Quality, Paper 098-29, SUGI 29, Intelligent Solutions, Inc., Bounder, CO, pp. 14, accessed Oct. 3, 2013.

GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.

Griffith, Daniel A., "A Generalized Huff Model," Geographical Analysis, Apr. 1982, vol. 14, No. 2, pp. 135-144.

Hibbert et al., "Prediction of Shopping Behavior Using a Huff Model Within a GIS Framework," Healthy Eating in Context Mar. 18, 2011, pp. 16.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.

Keylines.com, "KeyLines Datasheet," Mar. 2014, http://keylines.com/wp-content/uploads/2014/03/KeyLines-datasheet.pdf downloaded May 12, 2014 in 2 pages.

Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.

Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7-Dynamic Ontoloty Management System (Design)," Information Societies Technology Programme, Jan. 10, 2002, pp. 1-27.

Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Manske, "File Saving Dialogs," http://www.mozilla.org/editor/ui_specs/FileSaveDialogs.html, Jan. 20, 1999, pp. 7.

Map of San Jose, CA. Retrieved Oct. 2, 2013 from http://maps.google.com.

Map of San Jose, CA. Retrieved Oct. 2, 2013 from http://maps.bing.com.

Map of San Jose, CA. Retrieved Oct. 2, 2013 from http://maps.yahoo.com.

Microsoft—Develpoer Network, "Getting Started with VBA in Word 2010," Apr. 2010, http://msdn.microsoft.com/en-us/library/ff604039%28v=office.14%29.aspx as printed Apr. 4, 2014 in 17 pages.

Microsoft Office—Visio, "About connecting shapes," http://office.microsoft.com/en-us/visio-help/about-connecting-shapes-HP085050369.aspx printed Aug. 4, 2011 in 6 pages.

Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.

Miklau et al., "Securing History: Privacy and Accountability in Database Systems," 3rd Biennial Conference on Innovative Data Systems Research (CIDR), Jan. 7-10, 2007, Asilomar, California, pp. 387-396.

Niepert et al., "A Dynamic Ontology for a Dynamic Reference Work", Joint Conference on Digital Libraries, Jun. 17-22, 2007, Vancouver, British Columbia, Canada, pp. 1-10.

Palantir, "Extracting and Transforming Data with Kite," Palantir Technologies, Inc., Copyright 2010, pp. 38.

Palantir, "Kite," http://docs.palantir.com/gotham/3.11.1.0/adminreference/datasources.11 printed Aug. 30, 2013 in 2 pages.

Palantir, "Kite Data-Integration Process Overview," Palantir Technologies, Inc., Copyright 2010, pp. 48.

Palantir, "Kite Operations," Palantir Technologies, Inc., Copyright 2010, p. 1.

Palantir, "The Repository Element," http://docs.palantir.com/gotham/3.11.1.0/dataguide/kite_config_file.04 printed Aug. 30, 2013 in 2 pages.

Palantir, "Write a Kite Configuration File in Eclipse," Palantir Technologies, Inc., Copyright 2010, pp. 2.

Palantir, https://docs.palantir.com/gotham/3.11.1.0/dataguide/baggage/KiteSchema.xsd printed Apr. 4, 2014 in 4 pages.

Shah, Chintan, "Periodic Connections to Control Server Offer New Way to Detect Botnets," Oct. 24, 2013 in 6 pages, http://www.blogs.mcafee.com/mcafee-labs/periodic-links-to-control-server-offer-new-way-to-detect-botnets.

Wiggerts, T.A., "Using Clustering Algorithms in Legacy Systems Remodularization,"Reverse Engineering, Proceedings of the Fourth Working Conference, Netherlands, Oct. 6-8, 1997, IEEE Computer Soc., pp. 33-43.

(56) References Cited

OTHER PUBLICATIONS

Wollrath et al., "A Distributed Object Model for the Java System," Conference on Object-Oriented Technologies and Systems, Jun. 17-21, 1996, pp. 219-231.
Official Communication in Australian Application No. AU2007323689, dated Mar. 22, 2011.
International Search Report and Written Opinion in Application No. PCT/US07/085202, dated May 22, 2008.
International Search Report and Written Opinion in Application No. PCT/US2009/056703, dated Mar. 15, 2010.
Official Communication in New Zealand Application No. 624557 dated May 14, 2014.
European Search Report in Application No. 14159535.5 dated May 22, 2014.
Official Communication in New Zealand Application No. 622181 dated Mar. 24, 2014.
"A Tour of Pinboard," http://pinboard.in/tour as printed May 15, 2014 in 6 pages.
Bluttman et al., "Excel Formulas and Functions for Dummies," 2005, Wiley Publishing, Inc., pp. 280, 284-286.
Conner, Nancy, "Google Apps: The Missing Manual," Sharing and Collaborating on Documents, May 1, 2008, pp. 93-97, 106-113 & 120-121.
Crosby et al., "Efficient Data Structures for Tamper-Evident Logging," Department of Computer Science, Rice University, 2009, pp. 17.
Delicious, http://delicious.com/ as printed May 15, 2014 in 1 page.
FireEye, http://www.fireeye.com/ as printed Jun. 30, 2014 in 2 pages.
FireEye—Products and Solutions Overview, http://www.fireeye.com/products-and-solutions as printed Jun. 30, 2014 in 3 pages.
Goswami, Gautam, "Quite Writely Said!" One Brick at a Time, Aug. 21, 2005, pp. 7.
Holliday, JoAnne, "Replicated Database Recovery using Multicast Communication," IEEE 2002, pp. 11.
Lamport, "Time, Clocks and the Ordering of Events in a Distributed System," Communications of the ACM, Jul. 1978, vol. 21, No. 7, pp. 558-565.
Loeliger, Jon, "Version Control with Git," O'Reilly, May 2009, pp. 330.
Manno et al., "Introducing Collaboration in Single-user Applications through the Centralized Control Architecture," 2010, pp. 10.
Morrison et al., "Converting Users to Testers: An Alternative Approach to Load Test Script Creation, Parameterization and Data Correlation," CCSC: Southeastern Conference, JCSC 28, Dec. 2, 2012, pp. 188-196.
Nivas, Tuli, "Test Harness and Script Design Principles for Automated Testing of non-GUI or Web Based Applications," Performance Lab, Jun. 2011, pp. 30-37.
O'Sullivan, Bryan, "Making Sense of Revision Control Systems," Communications of the ACM, Sep. 2009, vol. 52, No. 9, pp. 57-62.
Palermo, Christopher J., "Memorandum," [Disclosure relating to U.S. Appl. No. 13/916,447, filed Jun. 12, 2013, and related applications], Jan. 31, 2014 in 3 pages.
Parker, Jr. et al., "Detection of Mutual Inconsistency in Distributed Systems," IEEE Transactions in Software Engineering, May 1983, vol. SE-9, No. 3, pp. 241-247.
Rouse, Margaret, "OLAP Cube," http://searchdatamanagement.techtarget.com/definition/OLAP-cube, Apr. 28, 2012, pp. 16.
"The FASTA Program Package," fasta-36.3.4, Mar. 25, 2011, pp. 29.
VirusTotal—About, http://www.virustotal.com/en/about/ as printed Jun. 30, 2014 in 8 pages.
Official Communication in Canadian Patent Application No. 2,666,364, dated Oct. 3, 2013.
International Search Report and Written Opinion in Application No. PCT/US2011/043794 dated Feb. 24, 2012.
Official Communication in New Zealand Application No. 612705, dated Jul. 9, 2013.
Official Communication in Australian Application No. 2012238282, dated Jan. 30, 2014.
Official Communication in Australian Application No. 2012238282, dated Jun. 6, 2014.
European Search Report in Application No. 13152370.6, dated Jun. 3, 2013.
Official Communication in European Application No. EP 14158861.6 dated Jun. 16, 2014.
Official Communication in New Zealand Application No. 622517 dated Apr. 3, 2014.
Official Communication in New Zealand Application No. 622389 dated Mar. 20, 2014.
Official Communication in New Zealand Application No. 622404 dated Mar. 20, 2014.
Official Communication in New Zealand Application No. 622484 dated Apr. 2, 2014.
Baker et al., "The Development of a Common Enumeration of Vulnerabilities and Exposures," Presented at the Second International Workshop on Recent Advances in Intrusion Detection, Sep. 7-9, 1999, pp. 35.
Lee et al., "A Data Mining and CIDF Based Approach for Detecting Novel and Distributed Intrusions," Lecture Notes in Computer Science, vol. 1907 Nov. 11, 2000, pp. 49-65.
US 8,712,906, 04/2014, Sprague et al. (withdrawn)

\* cited by examiner

| Entities | Redact hostname | Redact IP Addresses | Recipients | Anonymous? |
|---|---|---|---|---|
| Entity 1 | prod.example.net; application.example.net | 111.11.111.111; 111.10.111.111 | Entity 2, Entity 3 | Yes |
| Entity 2 | *.corp | 192.168.* | Entity 3 | No |
| Entity 3 | ab001.dev.com; ab002.qa.com; ab003.prod.com | 195.112.111.* | Entity 4 | No |
| Entity 4 | * | * | All | Yes |

FIG. 8A

```
<attack>
    <id>1</id>
    <type>DDOS</type>
    <from_ip_addresses>111.111.111.111,111.111.111.112,111.111.111.113,111.111.111.114</from_ip_addresses>
    <internal_ip_addresses>111.11.111.111; 111.10.111.111</internal_ip_addresses>
    <entity>1</entity>
</attack>
```
802

```
<modified_attack>
    <id>1</id>
    <type>DDOS</type>
    <from_ip_addresses>111.111.111.111,111.111.111.112,111.111.111.113,111.111.111.114</from_ip_addresses>
</modified_attack>
```
804

```
<attack>
    <id>2</id>
    <type>malware</type>
    <malware_hash>05A00000000000000000000000000000</malware_hash>
    <malware_name>Trojan ABC</malware_name>
    <from_ip_addresses>222.222.222.222,222.222.222.223,222.222.222.224,222.222.222.225</from_ip_addresses>
    <internal_ip_addresses>192.168.111.111,192.168.111.112</internal_ip_addresses>
    <entity>2</entity>
</attack>
```
806

```
<modified_attack>
    <id>2</id>
    <type>malware</type>
    <malware_hash>05A00000000000000000000000000000</malware_hash>
    <malware_name>Trojan ABC</malware_name>
    <from_ip_addresses>222.222.222.222,222.222.222.223,222.222.222.224,222.222.222.225</from_ip_addresses>
    <entity>2</entity>
</modified_attack>
```
808

FIG. 8B

```
<attack>
    <id>3</id>
    <type>Beacon</type>
    <heartbeat_ip_addresses>333.333.333.333</heartbeat_ip_addresses>
    <frequency>24:00:00</frequency>
    <internal_ip_addresses>111.11.111.111; 111.10.111.111</internal_ip_addresses>
    <entity>1</entity>
</attack>
```
810A

```
<attack>
    <id>4</id>
    <type>Beacon</type>
    <heartbeat_ip_addresses>444.444.444.444</heartbeat_ip_addresses>
    <frequency>24:00:00</frequency>
    <internal_ip_addresses>192.168.111.111,192.168.111.112</internal_ip_addresses>
    <entity>2</entity>
</attack>
```
810B

```
<attack>
    <id>5</id>
    <type>Beacon</type>
    <heartbeat_ip_addresses>555.555.555.555</heartbeat_ip_addresses>
    <frequency>24:00:00</frequency>
    <internal_ip_addresses>195.112.111.111 195.112.111.112</internal_ip_addresses>
    <entity>3</entity>
</attack>
```
810C

```
<ruleset>
    <id>1</id>
    <type>Beacon</type>
    <action>detect,alert</action>
    <frequency>24:00:00</frequency>
</ruleset>
```
812

```
<ruleset>
    <id>1</id>
    <type>Beacon</type>
    <action>alert,block</action>
    <block_ip_addresses>333.333.333.333,444.444.444.444,555.555.555.555</block_ip_addresses>
</ruleset>
```
814

FIG. 8C

SECURITY SHARING SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims benefit of U.S. Provisional Patent Application Ser. No. 61/942,480 filed Feb. 20, 2014, which is hereby incorporated by reference in its entirety.

CROSS-REFERENCE TO RELATED APPLICATIONS

This application is related to but does not claim priority from U.S. patent application Ser. No. 13/968,265 entitled "Generating Data Clusters With Customizable Analysis Strategies" filed Aug. 15, 2013, and U.S. patent application Ser. No. 13/968,213 entitled "Prioritizing Data Clusters With Customizable Scoring Strategies" filed Aug. 15, 2013, which are hereby incorporated by reference in their entireties and collectively referred to herein as the "Cluster references."

This application is related to but does not claim priority from U.S. Pat. No. 8,515,912 entitled "Sharing And Deconflicting Data Changes In A Multimaster Database System" filed Jul. 15, 2010, U.S. Pat. No. 8,527,461 entitled "Cross-ACL Multi-Master Replication" filed Nov. 27, 2012, U.S. patent application Ser. No. 13/076,804 entitled "Cross-Ontology Multi-Master Replication" filed Mar. 31, 2011, U.S. patent application Ser. No. 13/657,684 entitled "Sharing Information Between Nexuses That Use Different Classification Schemes For Information Access Control" filed Oct. 22, 2012, and U.S. patent application Ser. No. 13/922,437 entitled "System And Method For Incrementally Replicating Investigative Analysis Data" filed Jun. 20, 2013, which are hereby incorporated by reference in their entireties and collectively referred to herein as the "Sharing references."

This application is related to but does not claim priority from U.S. Pat. No. 8,489,623 entitled "Creating Data In A Data Store Using A Dynamic Ontology" filed May 12, 2011, which is hereby incorporated by reference in its entirety and referred to herein as the "Ontology reference."

BACKGROUND

In the area of computer-based platforms, security data may be collected, analyzed, and used to protect computer networks from unwanted behavior.

SUMMARY

The systems, methods, and devices described herein each have several aspects, no single one of which is solely responsible for its desirable attributes. Without limiting the scope of this disclosure, several non-limiting features will now be discussed briefly.

In some embodiments, a system for sharing security information comprises one or more computing devices programmed, via executable code instructions. When executed, the executable code instructions may cause the system to implement an attack data unit. The attack data unit may be configured to receive a plurality of security attack data from one or more entities. The security attack data may comprise information regarding one or more security attacks detected by respective entities. When further executed, the executable code instructions may cause the system to implement an attack data modification unit. The attack data modification unit may be configured to redact portions of the security attack data from various entities such that the redacted portions are not detectable in the security attack data. When further executed, the executable code instructions may cause the system to implement a distribution unit configured to share the security attack data with multiple entities.

In some embodiments, a non-transitory computer storage comprises instructions for causing one or more computing devices to share security information. When executed, the instructions may receive a plurality of security attack data from multiple entities. The security attack data may comprise information regarding one or more security attacks detected by respective entities. When further executed, the instructions may generate a ruleset based on the plurality of security attack data from multiple entities. The ruleset may be adapted to be executable by a plurality of the entities to recognize one or more security attacks. When further executed, the instructions may redact configurable portions of the security attack data from various entities such that the redacted portions are not detectable in the ruleset. When further executed, the instructions may transmit the ruleset, or a subset thereof, to one or more entities.

In some embodiments, a method for sharing security information comprises receiving a plurality of security attack data from multiple entities. The security attack data may comprise information regarding one or more security attacks detected by respective entities. The method may further comprise generating a ruleset based on the plurality of security attack information from multiple entities. The ruleset may be adapted to be executable by a plurality of the entities to recognize one or more security attacks. The method may further comprise redacting configurable portions of the security attack data from various entities such that the redacted portions are not detectable in the ruleset. The method may further comprise transmitting the ruleset to one or more entities.

In some embodiments, a system for sharing security information may share security attack data around specific security attacks and/or strategies for detecting security attacks.

BRIEF DESCRIPTION OF THE DRAWINGS

Certain aspects of the disclosure will become more readily appreciated as those aspects become better understood by reference to the following detailed description, when taken in conjunction with the accompanying drawings.

FIG. 8A illustrates an example security sharing table, according to some embodiments of the present disclosure.

FIG. 8B illustrates example attack data and/or modified attack data based on security attacks, according to some embodiments of the present disclosure.

FIG. 8C illustrates example attack data and/or rulesets based on multiple security attacks, according to some embodiments of the present disclosure.

DETAILED DESCRIPTION

Security information may be shared with the goal of improving particular aspects of computer and/or cyber security. For example, in a computer-based context, security information and strategies may be orally shared among institutions and/or individuals at a cyber-security conference. The institutions and/or individuals may then implement detection and/or defensive strategies on their computing systems. In another example, in a software application-based context, antivirus software may detect malicious files and/or code through sharing of hash values of malicious files and/or code. Upon scanning a computing device, malicious files and/or code may be removed and/or quarantined.

In addition to sharing of security data orally and/or in an information entity to entity manner, disclosed herein are systems for sharing security information among multiple entities. Using the techniques and systems described herein, security threats may be addressed more preemptively and/or efficiently by utilizing more information and/or analysis from other entities. Those techniques and systems may comprise automatically and/or in an ad hoc manner sharing attack information and/or generic rules to combat security threats.

Sharing attack information may allow for distributive and/or efficient responses to security threats. Institutions, organizations, entities, and/or the government may share attack information automatically and/or in an ad hoc manner. The security sharing system may modify attack data to redact confidential and/or sensitive information for sharing with other entities.

Sharing of generic rules through the security sharing system may efficiently combat security threats. In some embodiments, a rule may be generated by human technicians and/or any participating entity and pushed to the security sharing system for use by other participating entities. In some embodiments, a rule may be generated by the security sharing system following an attack on any entity using the system. A rule may differ from a specific attack by comprising more abstract characteristics of an attack that may be used to proactively detect other attacks. The rules may be configured to be enabled and/or implemented on other entities and/or computing systems to defend against and/or combat security attacks using their own proprietary data.

System Overview

Figure 1:
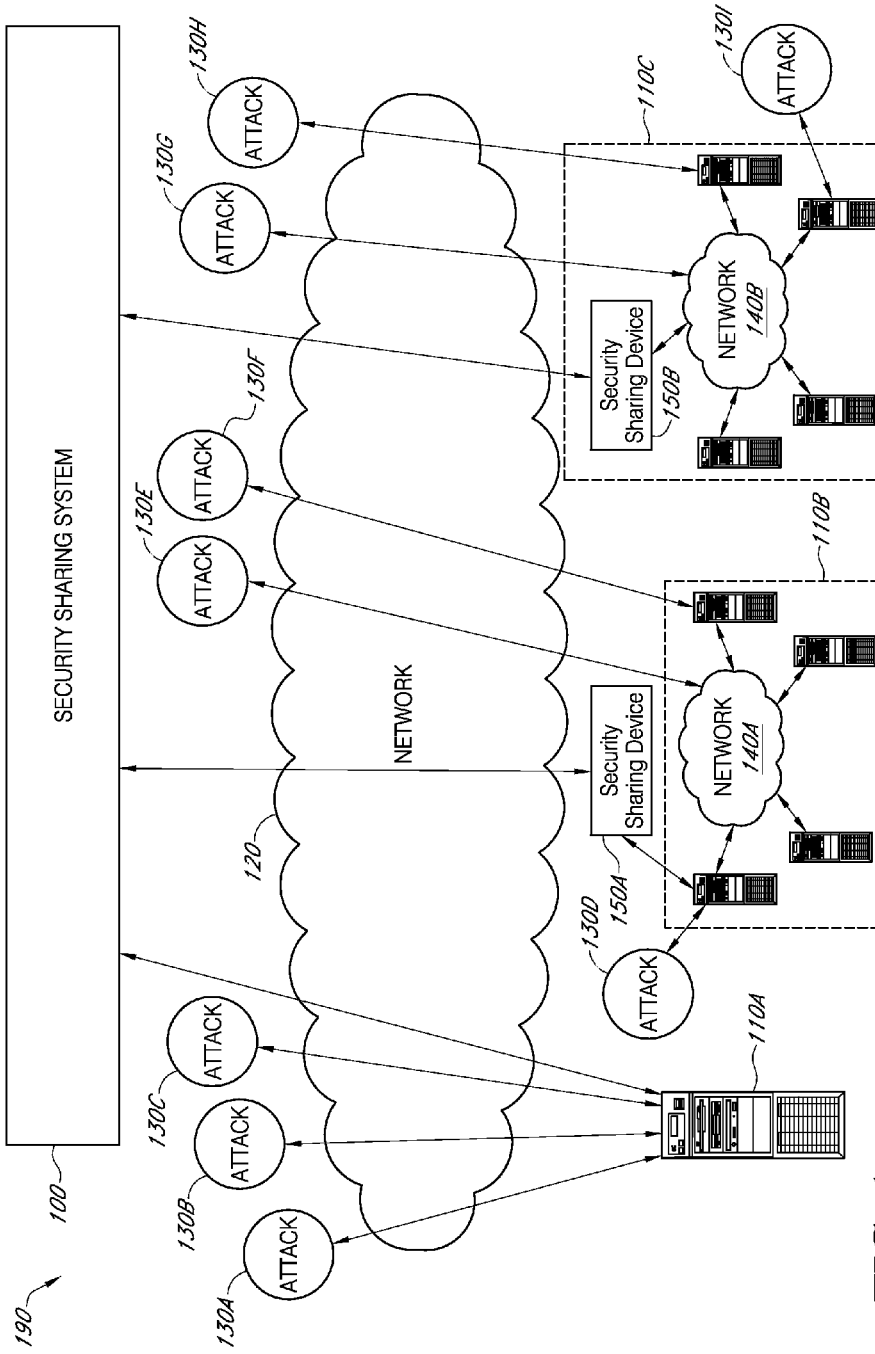
FIG. 1 is a block diagram illustrating an example security sharing system, according to some embodiments of the present disclosure.

FIG. 1 illustrates a security sharing system, according to some embodiments of the present disclosure. In the example embodiment of FIG. 1, the security sharing environment 190 comprises a network 120, a security sharing system 100, one or more security attacks 130 (including security attacks 130A, 130B, 130C, 130D, 130E, 130F, 130G, 130H, 130I in the example of FIG. 1), and one or more entities 110 (including entities 110A, 110B, and 110C in the example of FIG. 1). The network 120 may comprise, but is not limited to, one or more local area networks, wide area network, wireless local area network, wireless wide area network, the Internet, or any combination thereof. As shown by FIG. 1, the security sharing system 100 may share security data with one or more entities 110.

In some embodiments, the security sharing environment 190 may not comprise a network. Some entities, such as, but not limited to, government entities, may not be connected to a network and/or may not want to share security information via a network. Thus, sharing of security information by the security sharing system may occur via physical transport, such as, but not limited to, Universal Serial Bus drives, external hard drives, and/or any other type of media storage.

The entities 110 may comprise one or more computing devices. For example, an entity 110 may be institution, such as, but not limited to, a bank, a financial institution, or the government, comprised of one or more computer servers. As illustrated by entity 110B, an entity may comprise one or more computing devices connected via a network 140A, such as a secure LAN. The entity 110B may communicate with a security sharing device 150A, which may reside outside the network 140A. The security sharing device 150A may then communicate with the security sharing system 100. The security sharing device 150 may comprise all of that institution's cyber data and/or analysis. As illustrated by entity 110C, the security sharing device 150B may reside within an entity's network 140B. The entity may be connected via the network 120.

There may be many different variations and/or types of a security attack 130. Several examples of security attacks are discussed herein, but these are not limiting in the types of other security attacks the security sharing system may be able to detect. For example, a security attack may comprise malicious code and/or software, such as, but not limited to, Trojans, viruses, worms, and/or bots. Security attacks and/or security patterns may evolve and/or change over time. Therefore, the security sharing system may be configured to handle different types of security attacks and/or the changes in security attacks over time.

For example, a Trojan installs and/or infects itself in the computer servers of an entity, such as, a banking institution. The Trojan originates from a computing device with a source identifier, such as, but not limited to, an Internet Protocol ("IP") address. The Trojan then steals information and/or data from the entity, such as, but not limited to, credit card data, social security numbers, bank account numbers, personal data, names, phone numbers, addresses, and/or driver's license numbers. The Trojan sends the stolen information and/or data over the network 120 to one or more computing devices.

A security attack may comprise an attempt to make a computing device unavailable, such as, but not limited to, a denial of service (DOS) attack, or a distributed denial of service (DDOS) attack. For example, multiple computing devices saturate one or more computing devices of an entity with communication requests. In a DOS or DDOS attack, a goal of the multiple communication requests may be to make one or more computing devices unavailable to the network by overloading the computing devices with requests.

The security sharing system 100 may operate as a single instance, client server system, or as a distributed system. For example, there may be multiple instances of the security sharing system 100 running simultaneously that communicate through the network 120. In some embodiments, each security sharing system instance operates independently and/or autonomously. In some embodiments, there is a central server of the security sharing system 100 and individual clients of the security sharing system communicate with the central server via the network 120.

Example Attack Sharing Processes

Figure 2:
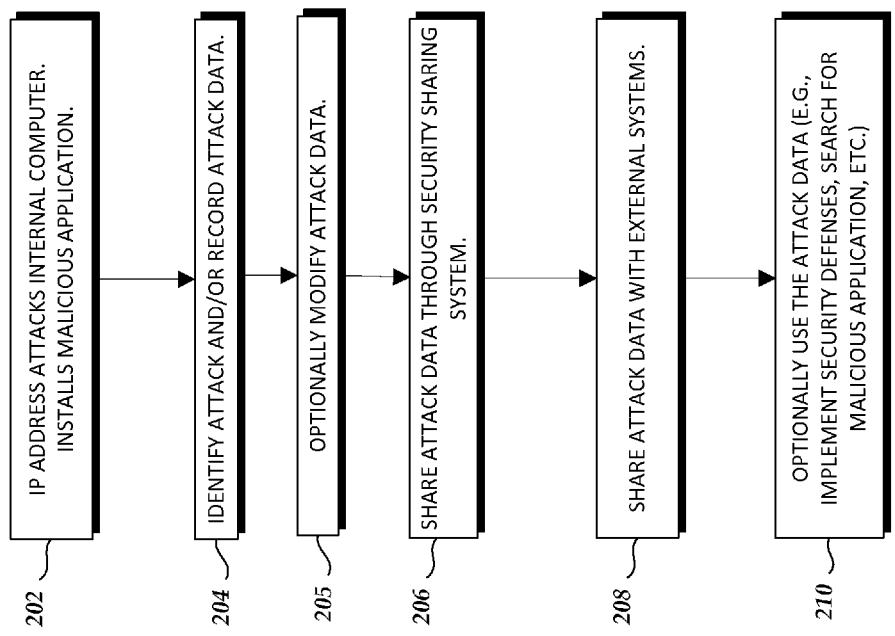
FIG. 2 is a flowchart illustrating an example attack sharing process, according to some embodiments of the present disclosure.

FIG. 2 is a flowchart illustrating an attack sharing process, according to some embodiments of the present disclosure. The method of FIG. 2 may be performed by the security sharing system and/or one or more entities discussed about with reference to FIG. 1. Depending on the embodiment, the method of FIG. 2 may include fewer or additional blocks and/or the blocks may be performed in order different than is illustrated.

Beginning in block 202, an attack is made on one of the computing devices of an entity 110. As noted above, various activities may be considered attacks on an entity 110. For example, a malicious application, such as a Trojan, may be installed on an entity's one or more internal computing devices. The malicious application may originate from an IP address.

At block 204, the security attack is identified and/or recorded as attack data. For example, the entity 110 may identify malicious software and/or communications from an external IP address, such as using antivirus or firewall software. The attack data may comprise information about the security attack, such as the IP address of the malicious application, an identifier for the malicious application, and/or the IP addresses of the internal computing devices that were attacked and/or infected. In some embodiments, the security attack may be identified automatically, such as by security and/or antivirus software, or the attack may be identified by a human operator, such as a system administrator or information technology technician. In some embodiments, attacks are initially detected by software and then a human technician confirms a software-detected attack before the attack data is shared, such as according to the process described below.

In some embodiments, identification of attacks occurs by the systems, methods, and/or techniques disclosed in the Cluster references. For example, related security attacks may be clustered as illustrated by U.S. patent application Ser. No. 13/968,265. A human technician may then view and analyze the cluster of related security attacks. Clusters of security attacks may also receive rankings and/or scorings as illustrated by U.S. patent application Ser. No. 13/968,213.

In some embodiments, attack data, rulesets, and/or other security information may be a data object according to the systems, methods, and/or techniques disclosed in the Ontology reference. For example, attack data, rulesets, and/or other security information may be included in data objects that are included in an ontology, which may be shared with other entities across the security sharing system and/or the data objects remain uniform across the entities they are shared with.

At block 205, the attack data may be optionally modified for sharing. For example, information regarding computing systems and/or employees of the entity 110 that was attacked may be removed from the attack data before it is shared with the security sharing system 100. The entity 110 may remove and/or modify data regarding the attack and/or the security sharing system 100 may remove and/or modify data regarding the attack once received from the entity 110 (e.g., as discussed below in block 206). In some embodiments, the attack data may be modified such that the network architecture and/or other proprietary information of the entity 110 is not indicated. For example, an entity 110 may want to share the attack data with others without exposing the particular network architecture and/or the specific computing devices that are part of the attack.

Next, at block 206 the attack data may be provided by the entity 110 to the security sharing system 100, such as via the network 120 of FIG. 1. Depending on the embodiment, the attack data may be shared in various manners, such as via a shared network location that stores the data, a direct communication via an email or HTTP communication, or in any other manner. The attack data may be in various formats, such as a database format, files, XML, JSON, a file format that is proprietary to the security sharing system 100, or any other format, and maybe encrypted or have security of any available type.

In some embodiments, sharing of attack data at block 206 occurs by the systems, methods, and/or techniques disclosed in the Sharing references. For example, attack data may be shared and deconflicted through a replicated database system as illustrated by U.S. Pat. No. 8,515,912. Attack data may also be shared through a database system with multiple ontologies as illustrated by U.S. patent application Ser. No. 13/076,804. The sharing of attack data may also occur via incremental database replication as illustrated by U.S. patent application Ser. No. 13/922,437.

In some embodiments, the clusters generated by the systems, methods, and/or techniques disclosed in the Cluster references and/or other security information may be shared by the systems, methods, and/or techniques disclosed in the Sharing references, other mechanisms illustrated in this disclosure, and/or any other manner.

At block 208, the attack data that is received at the security sharing system 100 is wholly or partially shared with one or more entities 110. For example, if the attack data is received from entity 110A, the security sharing system 100 may share the attack data to entities 110B, 110C, and/or external systems, such as in accordance with sharing preferences of the entities.

At block 210, the attack data may be optionally used by the entities with which the attack data is shared. For example, the attack data may be proactively detect and hopefully prevent similar attacks.

There may be some variations of the optional use of the attack data at block 210. For example, an entity 110B, such as a financial institution, may implement security defenses, such as, antivirus software, to defend against the malicious application identified in the attack data. In another example, the entity 110B, may conduct a search for the malicious application throughout the entity's computing devices based on the received attack data. Thus, the attack data may be used to identify previous attacks (which may be ongoing) and initiate recovery actions (e.g., quarantining infected files, blocking IP addresses, deleting files, reinstalling drivers, etc.).

Rulesets

A ruleset may comprise code instructions and/or sets of data that enable a security system and/or entity to implement detection and/or defense strategies against security attacks. A ruleset differs from specific attack data (such as was discussed above with reference to FIG. 2) in that a ruleset may include more abstract characteristics of an attack that can be used to detect other attacks. For example, a ruleset may comprise code instructions and/or data representing a beaconing behavior based on a pattern of communication and/or callback behavior by one or multiple entities from/to a common IP address (or group of IP addresses). In general, beaconing comprises communication from an entity's internal computing device to an external computer device that is believed to be malicious. Beaconing often occurs at regular intervals, such as every twenty-four hours. Thus, a beacon is traffic leaving the inside of a network at regular intervals. A beacon may be referred to as a phone home or heartbeat. Beacons can be used for malicious purposes, such as obtaining new orders from a command and control (C&C) server as well as to download updates or other tools (e.g., to malicious software installed on the entity's computing system). In some embodiments, beaconing may occur at irregular intervals, such as intervals that are determined based on a predetermined pattern algorithm, or at random intervals. Thus, a ruleset that identifies beaconing behavior does not necessarily indicate particular entities that have been attacked by the beaconing behavior, but may include characteristics of the beaconing behavior, such as may be reported by multiple entities, which can be used to detect similar attacks. For example, a beaconing ruleset may identify a group of IP addresses to which beacons are transmitted (e.g., from an attacked entity), a beaconing period (e.g. a fixed time period, a range of time periods, or algorithmic expression that defines a time period), and/or any other information that may be used by an entity to identify similar beaconing activities. Sharing of a beaconing ruleset, whether based on beaconing activities of a single entity or beaconing activities of multiple entities (e.g., as may be developed by the security sharing system 100 in response to receiving beaconing activity data from multiple entities), may enable early detection by the entity and/or the security sharing system of beaconing behavior.

A ruleset may be in various formats, such as source code and/or code instructions, a database format, files, XML, JSON, a file format that is proprietary to the security sharing system 100, or any other format, and may be encrypted or have security of any available type, and/or some combination thereof. In some embodiments, a ruleset may be enabled on different entities and/or computer systems without modification. For example, two different entities may use different proxy providers (e.g., computer servers that act as intermediaries for requests from clients seeking resources from other services). The ruleset may be sufficiently abstracted such that, with some configuration data and/or configuration of the entity's computing devices, the same ruleset checking for beaconing (or other) behavior may be run on different entities that have different proxy providers.

In some embodiments, rulesets and/or the output of rulesets may be clustered by the systems, methods, and/or techniques disclosed in the Cluster references. For example, related rulesets and/or the output of rulesets may be clustered as illustrated by U.S. patent application Ser. No. 13/968,265. A human technician may then view and analyze the cluster of related rulesets and/or output of the rulesets.

Example Ruleset Sharing

Figure 3:
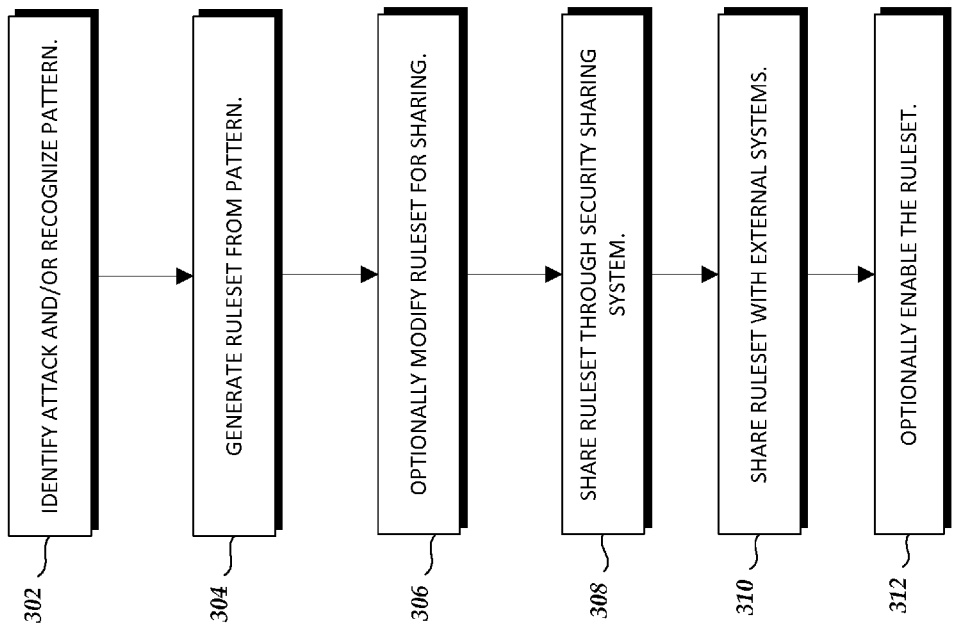
FIG. 3 is a flowchart illustrating an example ruleset sharing process for a specific attack, according to some embodiments of the present disclosure.

FIG. 3 is a flowchart illustrating a ruleset sharing process for a specific attack, according to some embodiments of the present disclosure. The method of FIG. 3 may be performed by the security sharing system and/or one or more entities discussed about with reference to FIG. 1. Depending on the embodiment, the method of FIG. 3 may include fewer or additional blocks and/or the blocks may be performed in order different than is illustrated.

Beginning at block 302, a security attack is detected and a pattern associated with the security attack is identified. For example, the security attack may correspond to a beaconing attack that includes hundreds of beacons that have been identified by a particular entity to a group of related IP addresses. A detected pattern may indicate a regular time period, e.g., twenty-four hours, at which beacons repeatedly transmitted to the same IPs.

In some embodiments, there may be some variations of identification of the security attack and recognition of the pattern at block 302. As previously illustrated in FIG. 2, identification of the attack at block 302 may be manual or automatic. Similarly, recognition of a pattern from the security attack at block 302 may be manual or automatic. For example, automatic pattern recognition by the security sharing system may occur from identifying beaconing at regular intervals and/or connections to the same external IP address. In some embodiments, humans may review the security attacks to recognize a pattern from them.

In some embodiments, similar to the identification of attacks, recognition of patterns occurs by the systems, methods, and/or techniques disclosed in the Cluster references.

At block 304, a ruleset may be generated from the recognized pattern. In some embodiments, generation of rulesets is automatic, manual, or some combination thereof.

At block 306, the ruleset may be optionally modified for sharing, such as in the manner discussed with reference to FIG. 4, below.

At block 308, the security sharing system may share the ruleset with one or more other entities or external systems. The sharing of the ruleset with external systems at block 310 may be similar to the sharing of the attack data at block 208 of FIG. 2.

At block 312, the ruleset may be optionally enabled by the external system and/or entity.

Modifying Attack Data and/or Rulesets

Figure 4:
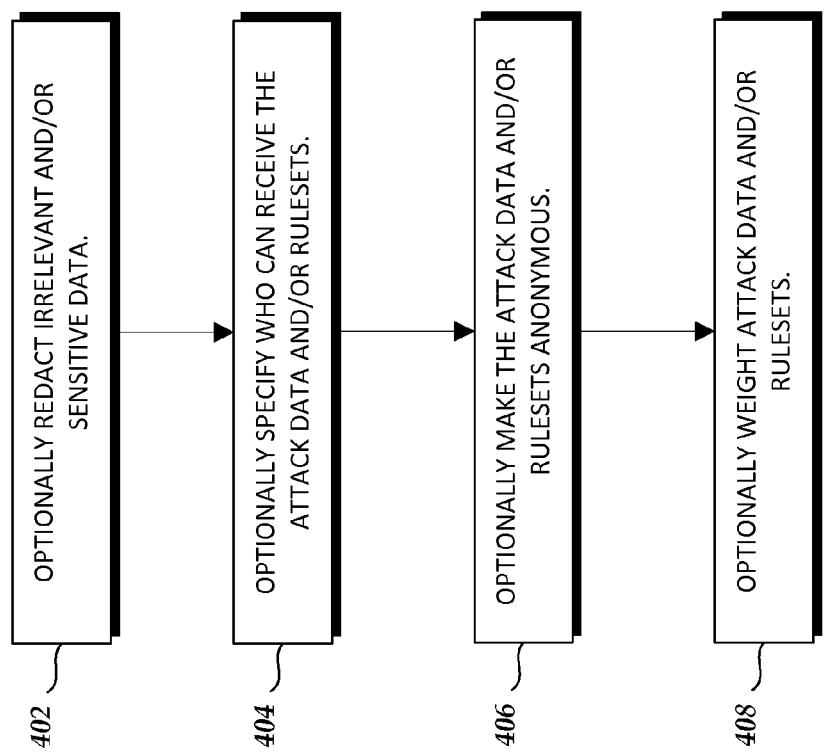
FIG. 4 is a flowchart illustrating an example modification process for attack data and/or rulesets, according to some embodiments of the present disclosure.

FIG. 4 is a flowchart illustrating a modification process for attack data and/or rulesets, according to some embodiments of the present disclosure. The method of FIG. 4 may be performed in whole, or in part, as part of block 205 of FIG. 2 and/or block 306 of FIG. 3. Depending on the embodiment, the method of FIG. 4 may include fewer or additional blocks and/or the blocks may be performed in order that is different than illustrated.

At block 402, irrelevant and/or sensitive data may be redacted from attack data and/or rulesets. For example, attack data may initially comprise the source identifiers of internal computing devices of an entity, such as, but not limited to, the IP addresses of the computing devices. An entity may not want to share their internal IP addresses of their computing devices. Therefore, an entity may redact and/or remove data from the attack data such as the IP addresses of the entity's internal computing devices. Removal of entity specific information, such as internal IP addresses, from attack data, may abstract the attack data to increase usability by other entities. In some embodiments, redaction of attack data and/or rulesets is automatic, manual, or some combination thereof. For example, there may be a configurable list of IP addresses, which correspond to internal computing devices, to be removed from attack data and/or rulesets. Redaction may require approval by a human operator. In some embodiments, redaction of attack data and/or rulesets may be performed by a human operator.

At block 404, recipients may be specified for attack data and/or rulesets. For example, an entity may only want to send attack data to other entities it has close relationships with more entities in a particular vertical market or having other attributes. Therefore, the entity may specify one or more entities criteria for entities with which attack data and/or rulesets security sharing system. The sharing data may be provided in any available format, and may apply to sharing of attack data and/or ruleset data from the entity that provides the sharing data. In some embodiments, a human operator must approve and/or select the recipients of attack data and/or rulesets.

In some embodiments, access controls for replicating attack data and/or rulesets at block 404 occurs by the systems, methods, and/or techniques disclosed in the Sharing references. For example, asynchronous replication of attack data and/or rulesets occur via access control policies illustrated by U.S. Pat. No. 8,527,461. Replication of attack data and/or rulesets may occur where databases use different classification schemes for information access control as illustrated by U.S. patent application Ser. No. 13/657,684.

At block 406, attack data and/or rulesets may be made anonymous. For example, attack data and/or rulesets may comprise the source entity of the attack data and/or rulesets. Thus, an entity may specify whether the sharing attack data and/or rulesets should be anonymous. In some embodiments, there is a global setting and/or configuration for specifying anonymity. There may be a configurable setting enabling anonymity for some recipients but not others. In some embodiments, a human may approve or specify anonymity for each attack data item and/or ruleset that is shared.

At block 408, attack data and/or rulesets may be weighted differently such as based on the entity that provides the attack data or rule set (e.g., some entities may be more reliable providing attack data than others) or based on the type of attack identified in the attack data or rule set, and/or other factors. For example, if attack data indicates a high security risk associated with the attack, the security sharing system may assign a high weighting to the attack data. However, if the reported attack is less malicious and/or from an entity that commonly misreports attacks, a lower weighting may be assigned to the attack data, such that sharing of the attack data doesn't introduce false attack alerts in other entities. Thus, in some embodiments the security sharing system tracks the accuracy of reported attacks from respective entities and automatically applies weightings and/or prioritizations to future reports from those entities based on the determined accuracy.

The weightings may be assigned manually and/or automatically. For example, in some embodiments a human operator specifies whether attack data and/or rulesets are important. These weightings may change over time, as the attacks themselves evolve.

From the receiving perspective of attack data and/or rulesets, an entity may optionally weight attack data and/or rulesets from different entities. Thus, if an entity values attack data and/or rulesets from a different entity highly, the entity may set a high level of priority for anything received from that different entity.

Sharing Attack Data and/or Rulesets

Figure 5:
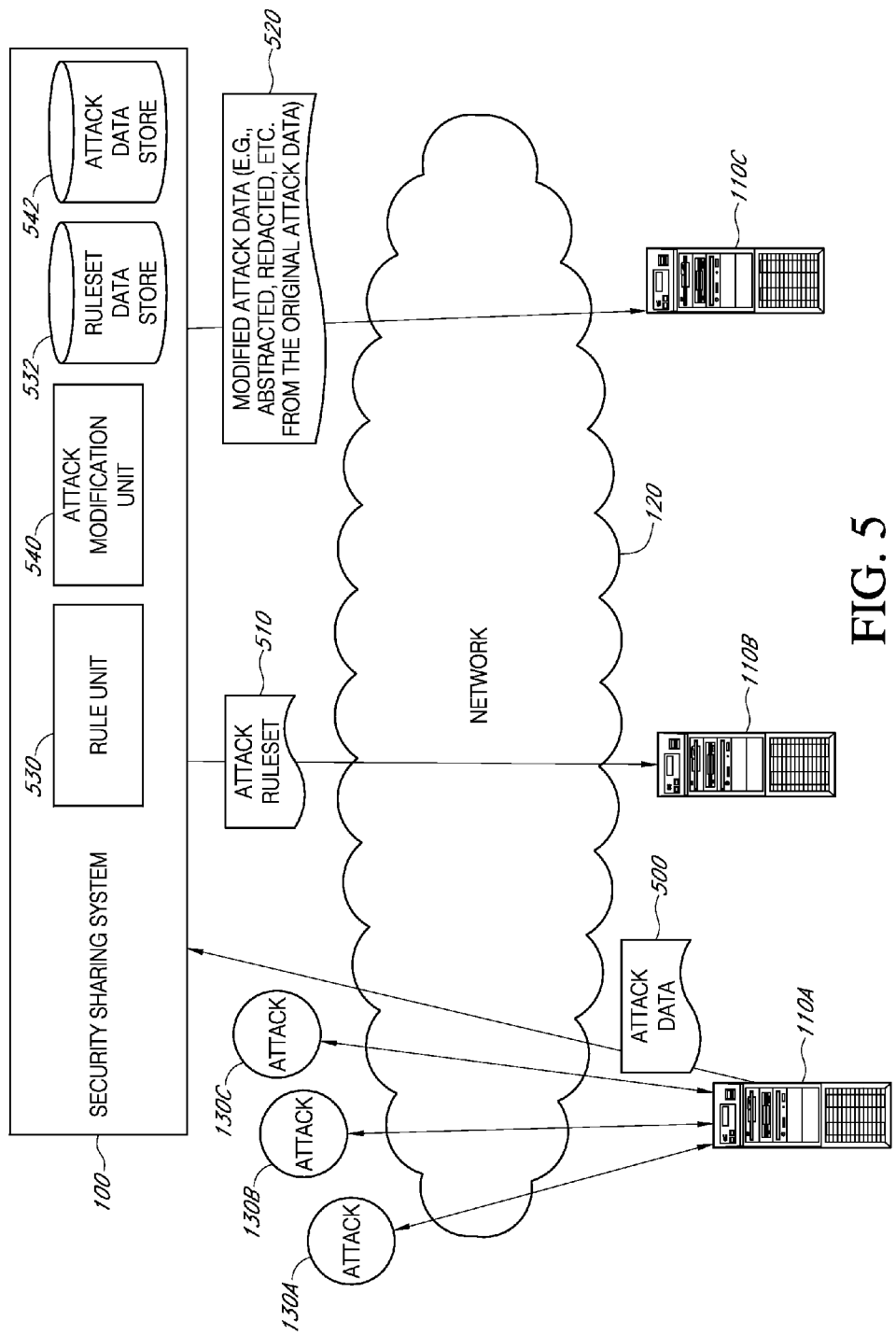
FIG. 5 is a block diagram illustrating an example security sharing system sharing attack data, rulesets, and/or modified attack data, according to some embodiments of the present disclosure.

FIG. 5 illustrates a security sharing system sharing attack data, rulesets, and/or modified attack data, or subsets thereof, according to some embodiments of the present disclosure. In accordance with some embodiments of the present disclosure, the security system 100 may comprise a rule unit 530, an attack modification unit 540, a ruleset data store 532, and/or attack data store 542.

As shown in the example of FIG. 5, an entity 110A has been involved in three attack communications 130A, 130B, and 130C (each comprising one or more transmissions and/or receptions of data from the entity 110A). In this embodiment, the entity 110A, upon identifying the one or more communications as an attack (see, e.g., FIG. 2) may send attack data 500 to the security sharing system 100 through the network 120. In some embodiments, the security sharing system 100 automatically collects attack data from a security attack.

In this example, the security sharing system 100 generates a ruleset based on the attack data 500 corresponding to the multiple attack communications 130A, 130B, and 130C, such as by any one or more processes discussed with reference to FIG. 3. For example, the multiple attacks 130A, 130B, and 130C illustrated in FIG. 5 may be associated with beaconing calls to an external computer device from the entity 110A. The attack ruleset 510 may be generated and/or output to other entities by the rule unit 530. The attack ruleset 510 may be stored in the attack data store 542. In the embodiment of FIG. 5, the security sharing system 100 shares the attack ruleset 510 with another entity 110B through the network 120 and the modified attack data 520 with another entity 110C. The entities 110B and 110C may change, update, modify, etc. security measures based on the ruleset 510 or modified attack data 520, respectively.

In some embodiments, the security sharing system may be able to automatically generate rulesets based on one or more security attacks. Similar to automatic recognition of security attack patterns, a ruleset may be automatically generated from patterns of security attacks, e.g., beaconing and/or DOS attacks. Rulesets may be automatically output by the rule unit 530. For example, the rule unit 530 may take as input data regarding security attacks and automatically generate a ruleset from patterns recognized in the data.

In some embodiments, a human operator and/or a team of technicians may review the security attack patterns to generate a ruleset. The security sharing system may provide user interface tools to humans for analyzing security attacks and/or creating rulesets. For example, rulesets may be generated by a human operator of the user interface of the rule unit 530. A user interface of the rule unit 530 may comprise a document processing interface to generate a ruleset.

In some embodiments, a team of engineers and/or technicians may consume all of the security information and/or data from all of the entities of the security sharing system. The engineers and/or technicians may conceive and/or generate rulesets to share them with entities through the security sharing system.

In some embodiments, rulesets may be generated by entities and shared through the security sharing system. For example, the rule unit 530 may receive rulesets from entities for distribution to other entities through the security sharing system.

The shared attack data and/or ruleset may be modified by the entity 110A and/or the security sharing system 100, such as by any one or more processes discussed with reference to FIG. 4. The attack modification unit 540 may modify the attack data 500 to output the modified attack data 520. The modified attack data 520 may be stored in the attack data store 542. Modification by the attack modification unit 540 and/or storage in the attack storage unit may achieve some of the goals and/or advantages illustrated in FIG. 4.

Example Ruleset Generation from Multiple Attacks

Figure 6:
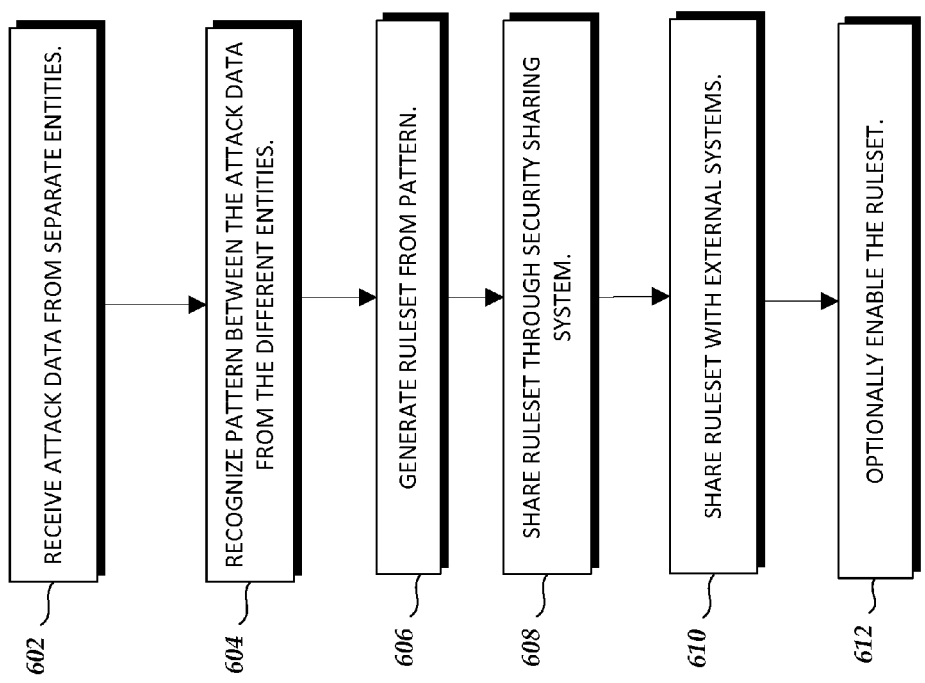
FIG. 6 is a flowchart illustrating an example ruleset sharing process for multiple attacks, according to some embodiments of the present disclosure.

FIG. 6 is a flowchart illustrating a ruleset sharing process for multiple attacks, according to some embodiments of the present disclosure. The method of FIG. 6 may be performed by the security sharing system and/or one or more entities discussed about with reference to FIG. 1. Depending on the embodiment, the method of FIG. 6 may include fewer or additional blocks and/or the blocks may be performed in order different than is illustrated.

Beginning at block 602, attack data is received from separate entities. For example, the attack data from different entities (e.g., entities 130) may correspond to hundreds of DOS attacks that have been identified by different entities.

At block 604, a pattern is associated and/or recognized from the attack data from different entities. A recognized pattern may indicate a particular source of the attack, e.g., a DOS attack that originates from a particular IP address range, or domain.

At block 606, a ruleset may be generated from the recognized pattern. The ruleset may be optionally modified for sharing.

At block 608, the ruleset may be shared through the security sharing system. For example, the ruleset may be shared with one or more entities that shared attack data used in generation of the ruleset and/or other entities that did not provide attack data used in generation of the ruleset, such as in accordance with sharing rules (e.g., FIG. 8A).

At block 610, the ruleset is shared through the security sharing system to external systems. The sharing of the ruleset with external systems at block 610 may be similar to the sharing of the attack data at block 208 of FIG. 2.

At block 612, the ruleset may be optionally enabled by the external system and/or entity.

Sharing Attack Data and/or Rulesets from Different Entities

Figure 7:
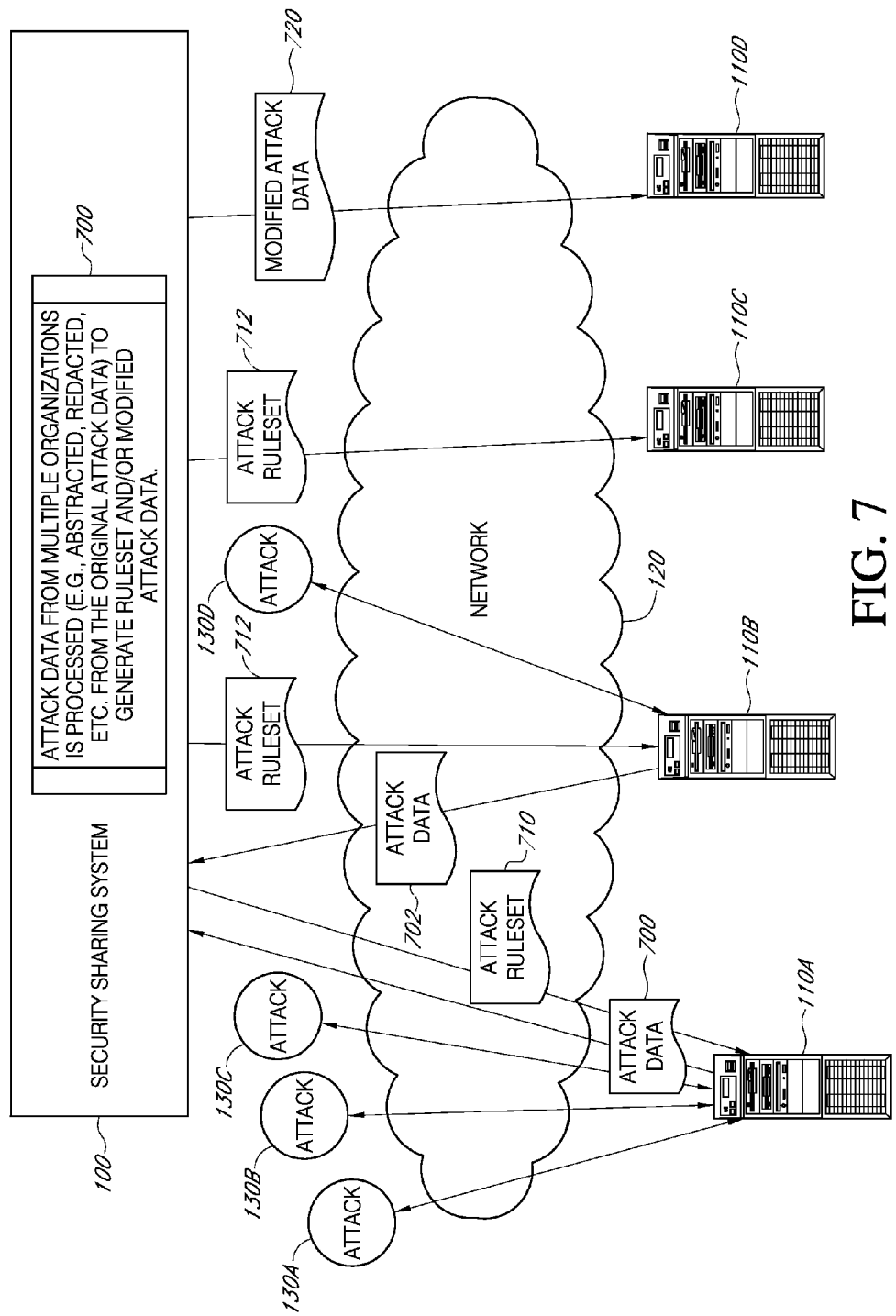
FIG. 7 is a block diagram illustrating an example security sharing system sharing attack data, rulesets, and/or modified attack data from different entities, according to some embodiments of the present disclosure.

FIG. 7 is a block diagram illustrating a security sharing system sharing attack data, rulesets, and/or modified attack data that has been received from and/or determined based on information from different entities, according to some embodiments of the present disclosure. As shown in the example of FIG. 7, the entity 110A has received three attack communications 130A, 130B, 130C and the entity 110B has received one attack communication 130D (although an attack, as used herein, may include one or any number of communications from and/or to an entity).

In this embodiment, the entity 110B, upon identifying the one or more communications as an attack (see, e.g., FIG. 2), may send attack data 702 to the security sharing system 100 through the network 120. Similar to entity 110B, entity 110A may send attack data 700, including information regarding attacks 130A, 130B, 130C, to the security sharing system 100. In this example, the security sharing system 100 generates a ruleset based on the attack data 700 from entity 110A and the attack data 702 from entity 110B. For example, the multiple attacks illustrated in FIG. 7 may be associated with DOS attacks from a set of computing devices associated with an IP address, a range of IP addresses, and/or a domain, for example.

Rule generation and/or sharing in FIG. 7 may be similar to FIG. 5.

The security sharing system 100 may process the attack data from different entities to share attack rulesets, attack data, and/or modified attack data. In FIG. 7, the security sharing system 100 shares modified attack data 720 with entity 110D, which may not have been attacked yet by the particular attack 130A-130D that were reported by entities 110A, 110B. For example, the modified attack data 720 may comprise the set of IP addresses where the DOS attacks originated from. The modified attack data 720 may differ from the attack data 700 by not having data regarding the internal computing devices that were targeted by the DOS attacks.

Sharing Tables

FIG. 8A illustrates an example security sharing table, according to some embodiments of the present disclosure. For example, the security sharing table may be one or more tables in a relational database of the security sharing system. In other examples, the security sharing table may be in various formats, such as a data object format, XML, JSON, a file format that is proprietary to the security sharing system, or any other format. The columns and/or fields shown in the table are illustrative. In some embodiments, there may be additional or less columns and/or fields. The security sharing table may be used to redact and/or modify any property of attack data, rulesets, and/or other security information of the security sharing system. The redaction and/or modification of any property may be possible because attack data, rulesets, and/or other security information may be in a data object format.

As shown in the example of FIG. 8A, the security sharing table may be used by the security sharing system (and/or by individual entities in some embodiments) to redact and/or modify attack data and/or rulesets. For example, there are four example entities shown. Attack data from a security attack may comprise the hostname and/or label for computing devices from an entity. Thus, the redact hostname column may be used to remove hostnames from attack data and/or rulesets. In the example, the hostnames "prod.example.net" and "application.example.net" will be removed from entity 1's attack data and/or rulesets. For entity 2, all of the hostnames ending in "corp" will be removed. As shown for entity 4, all hostnames may be removed from attack data and/or rulesets.

As shown in the example table of FIG. 8A, the four example entities have each provided different criteria for redacting or removing IP addresses from attack data and/or rulesets. According to these rules, the security sharing system may remove all internal IP addresses from attack data and/or rulesets from entity 4 and all internal IP addresses beginning with "192.168" from attack data and/or rulesets of entity 3.

The security sharing table may also be used to specify recipients for attack data and/or rulesets. For example, as shown in FIG. 8A, entity 1 has recipients: entity 2 and entity 3. Thus, the default recipients of entity 1 are entities 2 and 3 for sharing attack data and/or rulesets. As shown in the example table, entity 4 may share all of its attack data and/or rulesets with every entity in the security sharing system.

As shown in the example table of FIG. 8A, there may be a setting to make an entity anonymous while sharing attack data and/or rulesets. Entities 1 and 4 may share attack data and/or rulesets with other entities anonymously. For example, with the anonymous setting enabled, entity 1 can share attack data and/or rulesets with the security sharing system, which may then share that attack data, rulesets, and/or other ruleset generated based on the data received from entity 1, with other entities without identifying entity 1 as a source of the attack data.

Example Attack Data, Modified Attack Data, and/or Rulesets

Figure 8D:
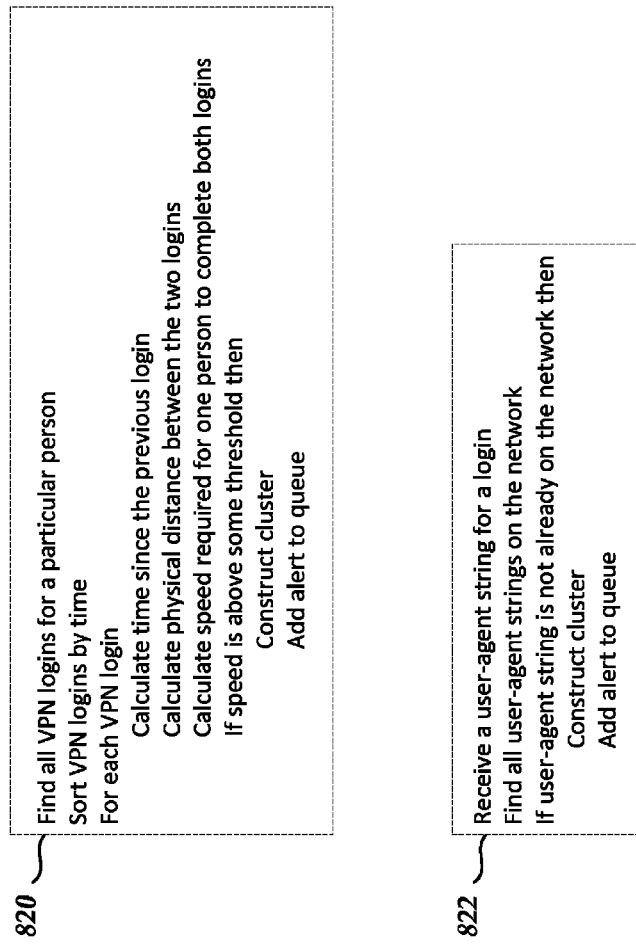
FIG. 8D illustrates example rulesets in a format comprising code instructions, according to some embodiments of the present disclosure.

As previously illustrated, attack data, modified attack data, and/or rulesets may be in various formats and/or combinations of formats and are not limited to the example formats shown in FIGS. 8B, 8C, and 8D.

FIG. 8B illustrates example attack data and/or modified attack data based on security attacks, according to some embodiments of the present disclosure. For example, a security attack may be a DDOS attack with four originating IP addresses, shown in the <from_ip_addresses> element of the example attack data 802. The example attack data 802 also includes an attack identifier (in the <id> element), and identifies the type of attack (in the <type> element), internal IP addresses affected by the attack (in the <internal_ip_addresses> element) and entity providing the attack data (in the <entity> element>).

The security sharing system may modify the attack data 802, such as in the manner discussed with reference to FIG. 4 and/or FIG. 8A, to output modified attack data 804. As illustrated, modified attack data 804 may not contain the source entity of the attack data (e.g., the <entity> element is removed) and/or the internal IP addresses (e.g., the <internal_ip_addresses> element is removed) of the source entity, which may correspond to the preferences illustrated with reference to the sharing table of FIG. 8A. For example, the sharing table of FIG. 8A specified that entity 1 should remain anonymous and redact certain IP addresses. In another embodiment, entity 1 may include its identifier (e.g., include the <entity> element) and the security sharing system may anonymize the attack data by not indicating to other entities with which the attack data is shared that the attack data came from entity 1. In this way, data that is received by the security sharing system may still determine reliability of information based on source of information, even without sharing the exact identity of the source with other entities.

In another example, a security attack may be a previously illustrated Trojan attack with four originating IP addresses. Similar to the previous example, an entity may send attack data 806 to the security sharing system and/or the security sharing system may modify the attack data 806 to output modified attack data 808. Unlike modified attack data 804, which may be anonymous, modified attack data 808 may contain the source entity of the attack data, which may correspond to the preferences illustrated with reference to the sharing table of FIG. 8A. For example, the sharing table of FIG. 8A specified that entity 2 should not be anonymous. Similar to modified attack data 804, modified attack data 808 does not contain the internal IP addresses of entity 2, which may correspond to the preferences illustrated with reference to the sharing table of FIG. 8A.

FIG. 8C illustrates example attack data and rulesets based on multiple security attacks, according to some embodiments of the present disclosure. For example, attack data 810A, 810B, 810C correspond to three separate beaconing attacks against different entities may be received by the security sharing system. While in this example the attack data 810 are received from three separate entities (entity 1, entity 2, and entity 3), in other embodiments the attack data used to form a ruleset may all be received from the same entity.

The security system may generate ruleset 812 and ruleset 814, such as in the manner discussed with reference to FIG. 6 and/or FIG. 7, based on the attack data 810. The security sharing system may interpret and/or redact the attack data, such as in accordance with redaction rules (e.g., FIG. 8A). For example, each of the attack data 810 includes internal IP addresses (in the <internal_ip_addresses> element) and source entity data (in the <entity> element). However, the ruleset 812 may comprise more abstract characteristics of the attack data 810, such as the type of attack (in the <type> element) and/or the frequency of the attack for beaconing attacks (in the <frequency> element), while excluding specific attack characteristics such as internal IP addresses (e.g., the <internal_ip_addresses> element is removed) and source entity data (e.g., the <entity> element is removed). Another example of a ruleset is examining the method and/or behavior of attackers over time. For example, some hacking groups may only work during certain hours, thus may be more likely to attack during those time periods. These groups may mask the IPs they use, such that merely using the attack data may not be enough. A ruleset may allow entities to track malicious patterns even as the attack data itself changes. The ruleset 812 may also comprise actions to perform, such as, but not limited to, detecting attacks and/or alerting of suspicious behavior (in the <action> element). The security sharing system may interpret the attack data 810 to generate ruleset 814 to block malicious IP addresses. In the example, ruleset 814 comprises alerting and blocking actions (in the <action> element). Thus, an entity enabling ruleset 814 may automatically block malicious IP addresses (in the <block_ip_addresses> element). In some embodiments, attack data may be automatically interpreted to generate a ruleset to block a range of IP addresses.

FIG. 8D illustrates example rulesets 820 and 822 in a format comprising code instructions, according to some embodiments of the present disclosure. In some embodiments, rulesets may be complex enough such that their expression may be in a format comprising code instructions. The executable code instructions shown in FIG. 8D are illustrative pseudocode and, thus, may not correspond to any specific programming language or be executable in the format shown. Executable code that performs the functions outlined in rulesets 820 and 822 may be provided in any available programming language.

Example ruleset 820 comprises code configured to detect security attacks for globetrotter logins. In a globetrotter security attack, there may be Virtual Private Network ("VPN") logins from locations that would be physically impossible for a single person to make. For example, logins by the same person from the United States and India within minutes and/or one hour of each other. Thus, the ruleset 820 includes code instructions that cause an entity's computing device and/or the security sharing system to find all VPN logins for a particular person. The VPN logins may then be sorted by time of login. The VPN logins may be iterated through by a for loop, which may first calculate the time since the previous login, the physical distance between locations of two previous logins, and the travel speed required for a person to complete both logins. If the speed is over a threshold then a cluster may be constructed, such as by using the IP addresses and or identity of the person as seeds (see the Cluster references), and an alert may be added to a queue. For example, if the speed threshold was set to a speed, such as, 2,000 miles per hour, then an alert would appear if there was a login between the United States and Japan within an hour of each other. Thus, the ruleset 820 may enable the detection of globetrotter security attacks.

Example ruleset 822 comprises code to detect security attacks for fake user-agent logins. In a fake user-agent security attack, malware may provide fake and/or made up user-agent logins and/or strings to gain access to an entity's network and/or resources. For example, the code instructions shown in 822 cause an entity's computing device and/or the security sharing system to receive a user-agent string for a login and find all of the user-agent strings on the network. If the user-agent string is not already on the network and/or is a new user-agent string, then a cluster may be constructed (see the Cluster references) and an alert may be added to a queue. Thus, the ruleset 822 may enable the detection of fake user-agent security attacks.

In some embodiments, rulesets may comprise various formats and/or combinations of formats. For example, a beaconing ruleset may comprise executable code instructions and/or XML documents. In the beaconing example, the executable code instructions may comprise programming logic to detect beaconing attacks. The XML documents may comprise parameters and/or configurations. In the beaconing example, the XML documents may comprise parameters for checking different beaconing frequencies, e.g., every hour and/or every twenty-four hours. Thus, both the code instructions and the parameterized format, such as, but not limited to, XML, may be shared through the security sharing system.

Example User Interface

Figure 9A:
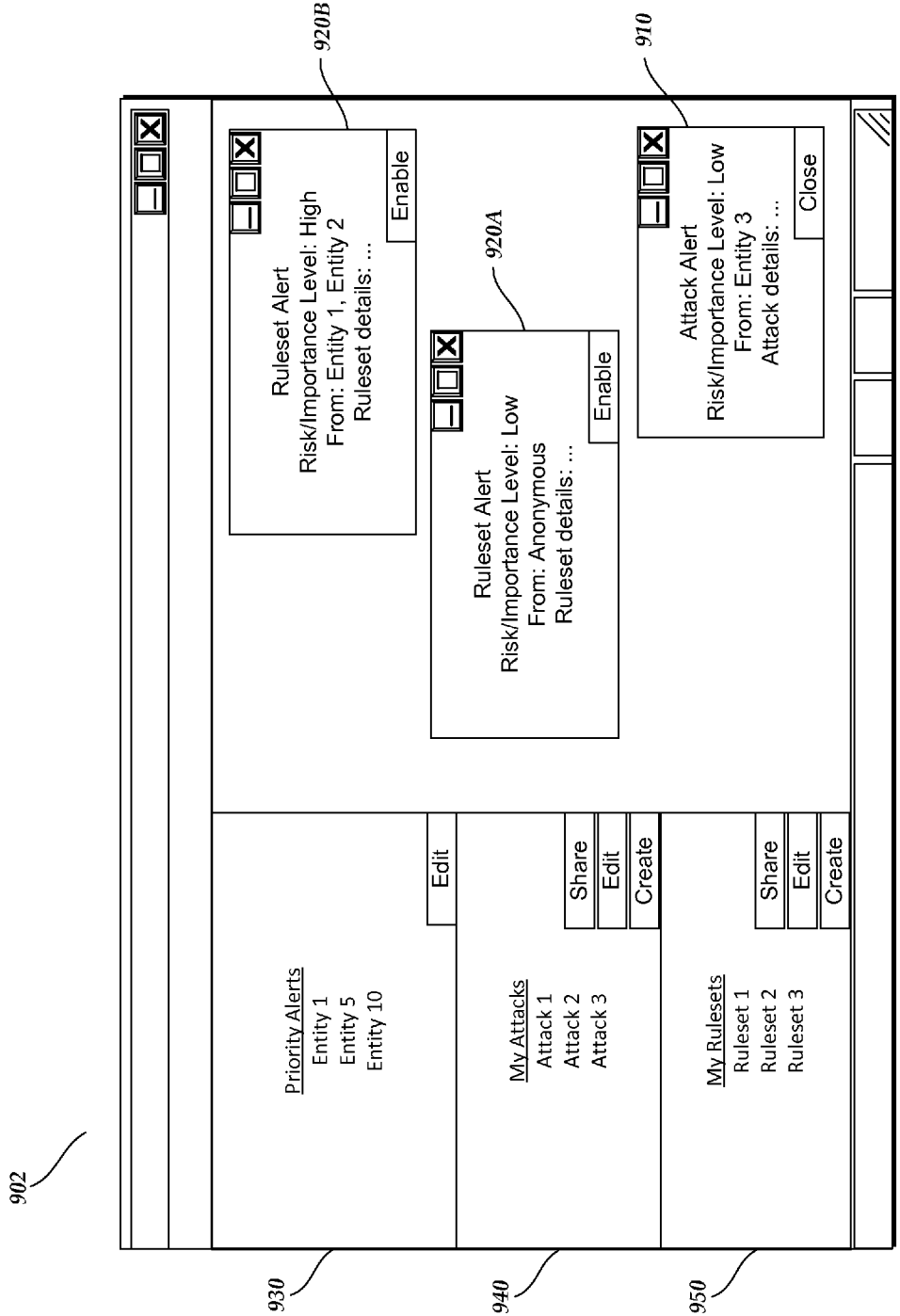
FIG. 9A illustrates an example user interface of the security sharing system, according to some embodiments of the present disclosure.
Figure 9B:
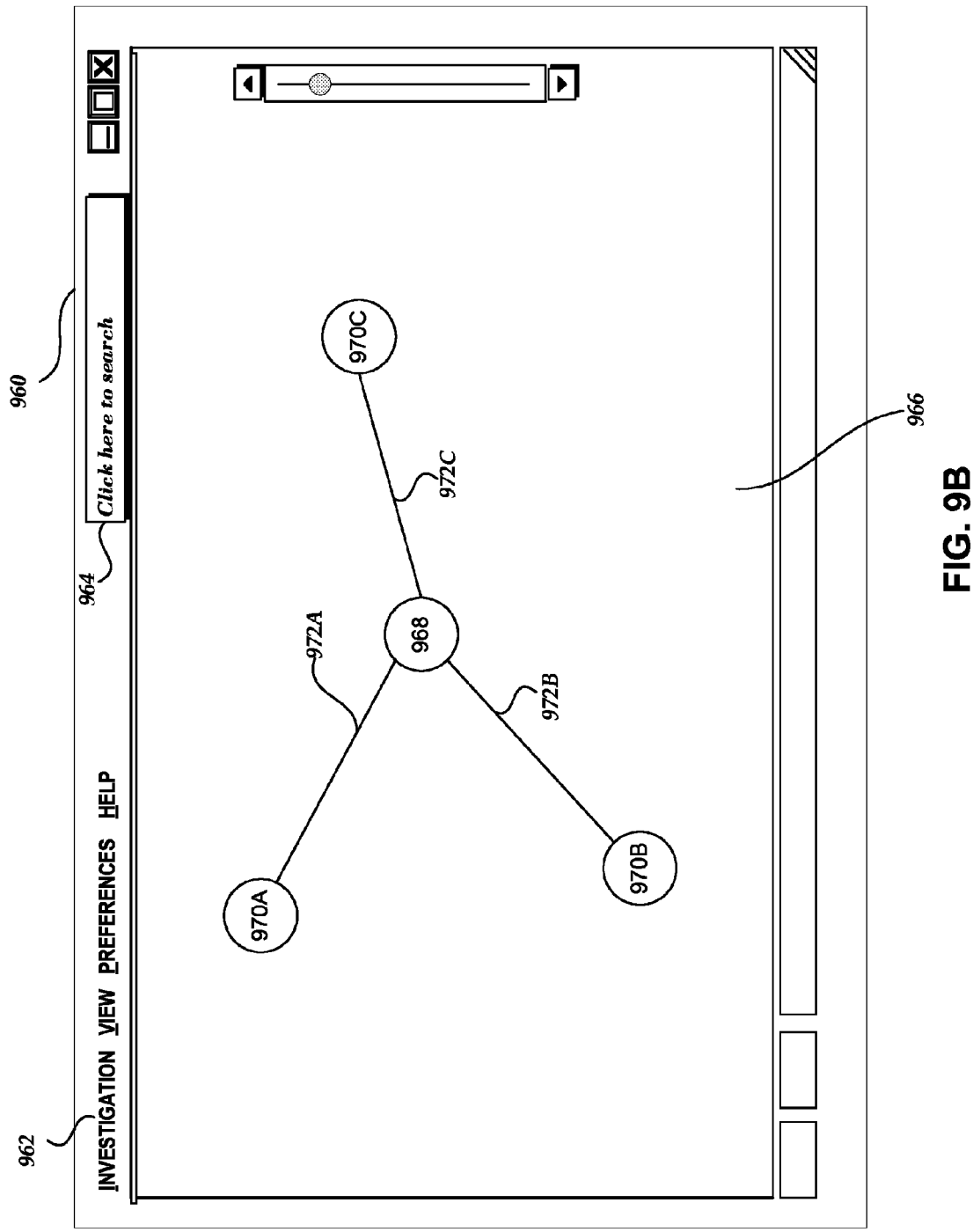
FIG. 9B illustrates an example user interface for viewing data objects within the security sharing system, according to some embodiments of the present disclosure.

FIGS. 9A and 9B illustrate example user interfaces of the security sharing system, according to some embodiments of the present disclosure. In some embodiments, the user interfaces described below may be displayed in any suitable computer system and/or application, for example, in a web browser window and/or a standalone software application, among others. Additionally, the functionality and/or user interfaces of the system as shown in FIGS. 9A and/or 9B may be implemented in one or more computer processors and/or computing devices, as is described with reference to FIG. 10.

Referring to FIG. 9A, the example user interface 902 comprises security alerts 910, 920A, 920B, priority alert window 930, attacks window 940, and/or rulesets window 950.

In operation, a human operator may view security attack alerts through the user interface 902. For example, when an entity shares security attack data with the entity viewing the user interface 902, a security attack alert 910 may appear. The security attack alert 910 may display a risk/importance level, and/or "from" entity indicating the source of the security attack alert. The security attack alert 910 may also display details of the alert and/or a link to the details. For example, security attack alert details may comprise the IP address source of the attack, and/or the type of attack, e.g., beaconing, DOS attack, etc.

In the example of FIG. 9A, a human operator may also view ruleset alerts through the user interface. For example, when a ruleset is shared in the security sharing system, ruleset alerts, 920A and 920B may appear. Ruleset alerts 920A and 920B may be similar to security attack alert 910, but instead of security attack details, ruleset alerts 920A and 920B may display ruleset details. In the beaconing example, ruleset details may comprise an IP range to which beacons are sent and/or a frequency that a beacon is sent to an external computing device. The ruleset alerts windows 920 may have an "enable" button that activates the ruleset as previously described.

In some embodiments, the security attack alert 910 may have an "enable" button that activates the security attack alert similar to activating a ruleset. For example, enabling a security attack alert automatically sets alerts and/or detection of the malicious IP addresses specified in the security attack alert. The security sharing system may automatically generate a ruleset from the security attack alert when the security attack alert is enabled. In some embodiments, generation of the ruleset in response to activation of the security attack alert may occur without notification to the human operator. Thus, enabling a security attack alert may be a shortcut for generating a ruleset.

The priority alert window 930 may display entities that will receive a "high" and/or "important" priority level when those entities share attack data and/or rulesets with the particular entity viewing/operating the user interface 902. For example, in the priority alert window 930, entities 1, 5, and 10 are selected for priority alerts. In this example, the priority alert window 930 comprises an "edit" button to add and/or remove entities for priority alerts.

The attacks window 940 may display the security attacks that have been identified for the particular entity operating/viewing the user interface 902. For example, the attacks window 940 displays security attacks 1, 2, and 4. The attacks window 940 may be populated automatically by the security sharing system and/or by the entity. In the example attacks window 940, there is a "create" button, which may allow the human operator to add a security attack. The attacks window 940 may have a "share" button, which may allow the human operator to select one or more security attacks for sharing through the security sharing system, and may have options to share the security attack data, modified security attack data, and/or a ruleset regarding the security attack (possibly in connection with other security attacks). The attacks window 940 may also have an "edit" button, which may allow the human operator to edit and/or modify a security attack. For example, a security attack 1 may be a DDOS attack with two originating IP addresses for the attack, and security attack 1 may be edited to add and/or remove IP addresses. Alternatively, such updates may be performed automatically by the entity and/or the security sharing system based on predetermined rules for modifying attack data.

The rulesets window 950 may display the rulesets from an entity. The rulesets window 950 may be operated similar to the attacks window 940, except the rulesets window may be configured to display, create, and/or modify rulesets instead of security attacks. For example, ruleset 1 may be a beaconing ruleset with a frequency of twenty-four hours, and the example ruleset may be edited to a beaconing frequency of forty eight hours. Rulesets may be selected to display further information regarding the rulesets, such as the various rules of the ruleset, one or more entities having attack data on which the ruleset was based, other entities with which the ruleset has been shared (and/or is available for sharing), and/or entities that have actually implemented security measures in view of the ruleset, for example.

Referring to FIG. 9B, the example user interface 960 comprises a search box 964, an object display area 966, and/or a menu bar 962. A human operator by typing and/or entering data into the search box 964 may load, lookup, and/or retrieve one or more objects. The user interface 960 may display security attack data, rulesets, and/or other security information in clusters, which may correspond to the systems, methods, and/or techniques disclosed in the Ontology and/or Cluster references.

For example, by typing the name of a type of security attack, such as "beacon," an attack data object 968 may be displayed in the object display area 966. The other objects 970 (including objects 970A, 970B, and/or 970C) may be displayed automatically and/or after user interaction by the human operator with the person object 410. The objects 970 may correspond to related security attacks, resources of the entity that have been attacked, and/or any other data object in the security sharing system. The one or more links 972 (including links 972A, 972B, and/or 972C) may display relationships between the attack data object 968 and related objects 970.

In addition to visually searching and/or showing data objects and/or relationships between data objects, the user interface 960 may allow various other manipulations. For example, data objects may be inspected (e.g., by viewing properties and/or associated data of the data objects), filtered (e.g., narrowing the universe of objects into sets and subsets by properties or relationships), and statistically aggregated (e.g., numerically summarized based on summarization criteria), among other operations and visualizations.

Implementation Mechanisms

The various computing device(s) discussed herein, such as the entities 110 and/or security sharing system 100, are generally controlled and coordinated by operating system software, such as, but not limited to, iOS, Android, Chrome OS, Windows XP, Windows Vista, Windows 7, Windows 8, Windows Server, Windows CE, Unix, Linux, SunOS, Solaris, Macintosh OS X, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things. The security sharing system 100 may be hosted and/or executed on one or more computing devices with one or more hardware processors and with any of the previously mentioned operating system software.

Figure 10:
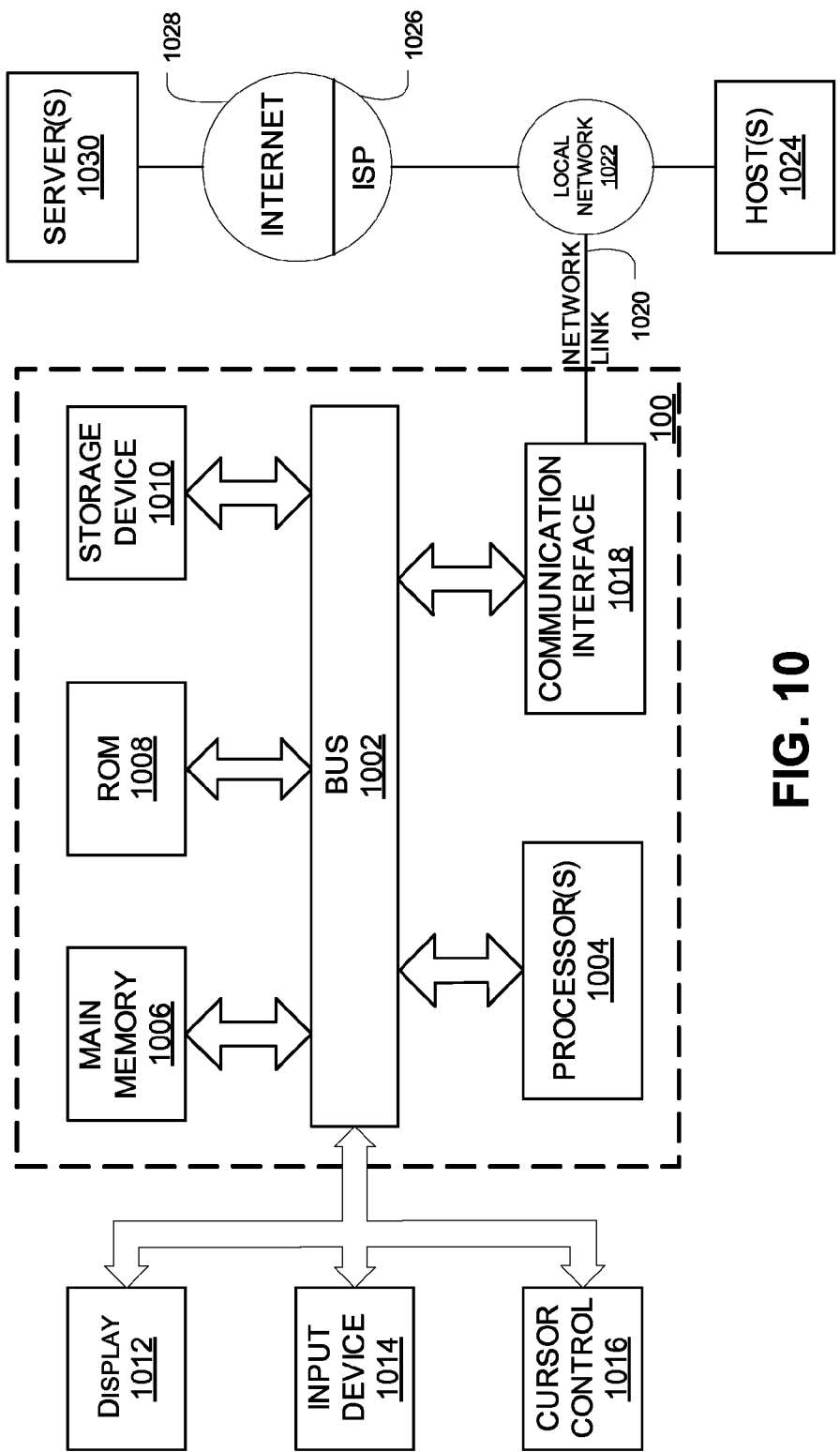
FIG. 10 is a block diagram illustrating an example security sharing system with which various methods and systems discussed herein may be implemented.

FIG. 10 is a block diagram that illustrates example components of the security sharing system 100. While FIG. 10 refers to the security sharing system 100, any of the other computing devices discussed herein may have some or all of the same or similar components.

The security sharing 100 may execute software, e.g., standalone software applications, applications within browsers, network applications, etc., whether by the particular application, the operating system, or otherwise. Any of the systems discussed herein may be performed by the security sharing 100 and/or a similar computing system having some or all of the components discussed with reference to FIG. 10.

The security sharing system 100 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

The security sharing system 100 also includes a main memory 1006, such as a random access memory (RAM), cache and/or other dynamic storage devices, coupled to bus 1002 for storing information and instructions to be executed by processor(s) 1004. Main memory 1006 also may be used for storing temporary variables or other intermediate information during execution of instructions to be executed by processor(s) 1004. Such instructions, when stored in storage media accessible to processor(s) 1004, render the security sharing system 100 into a special-purpose machine that is customized to perform the operations specified in the instructions. Such instructions, as executed by hardware processors, may implement the methods and systems described herein for sharing security information.

The security sharing system 100 further includes a read only memory (ROM) 1008 or other static storage device coupled to bus 1002 for storing static information and instructions for processor(s) 1004. A storage device 1010, such as a magnetic disk, optical disk, or USB thumb drive (Flash drive), etc., is provided and coupled to bus 1002 for storing information and instructions. The rule unit 530, attack modification unit 540, ruleset data store 532 and/or attack data store 542 of FIG. 5 may be stored on the main memory 1006 and/or the storage device 1010.

In some embodiments, the ruleset data store 532 of FIG. 5 is a file system, relational database such as, but not limited to, MySql, Oracle, Sybase, or DB2, and/or a distributed in memory caching system such as, but not limited to, Memcache, Memcached, or Java Caching System. The attack data store 542 of FIG. 5 may be a similar file system, relational database and/or distributed in memory caching system as the ruleset data store 532.

The security sharing system 100 may be coupled via bus 1002 to a display 1012, such as a cathode ray tube (CRT) or LCD display or touch screen, for displaying information to a computer user. An input device 1014 is coupled to bus 1002 for communicating information and command selections to processor 504. One type of input device 1014 is a keyboard including alphanumeric and other keys. Another type of input device 1014 is a touch screen. Another type of user input device is cursor control 1016, such as a mouse, a trackball, a touch screen, or cursor direction keys for communicating direction information and command selections to processor 1004 and for controlling cursor movement on display 1012. This input device may have two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The security sharing system 100 may include a user interface unit to implement a GUI, for example, FIG. 9A and/or FIG. 9B, which may be stored in a mass storage device as executable software codes that are executed by the computing device(s). This and other units may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "instructions," as used herein, refers to logic embodied in hardware or firmware, or to a collection of software units, possibly having entry and exit points, written in a programming language, such as, but not limited to, Java, Lua, C, C++, or C#. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The security sharing system 100, or components of it, such as the rule unit 530 and/or the attack modification unit 540 of FIG. 5, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor(s) 1004 for execution. For example, the instructions may initially be carried on a magnetic disk or solid state drive of a remote computer. The remote computer may load the instructions into its dynamic memory and send the instructions over a telephone or cable line using a modem. A modem local to the security sharing system 100 may receive the data on the telephone or cable line and use an infra-red transmitter to convert the data to an infra-red signal. An infra-red detector can receive the data carried in the infra-red signal and appropriate circuitry can place the data on bus 1002. Bus 1002 carries the data to main memory 1006, from which the processor(s) 1004 retrieves and executes the instructions. The instructions received by main memory 1006 may retrieve and execute the instructions. The instructions received by main memory 1006 may optionally be stored on storage device 1010 either before or after execution by processor(s) 1004.

The security sharing system 100 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to be communicated with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from the security sharing system 100, are example forms of transmission media.

The security sharing system 100 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor(s) 1004 as it is received, and/or stored in storage device 1010, or other non-volatile storage for later execution.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system for sharing of security information, the system comprising:
one or more computing devices programmed, via executable code instructions, to:
receive a first plurality of security attack data objects from a first entity, the first plurality of security attack data objects comprising information regarding one or more security attacks detected by the first entity, each security attack data object from the first plurality of security attack data objects associated with a first access control list comprising indications of privacy of respective security attack data objects or indications of respective one or more entities permissioned to receive respective security attack data objects;
determine a first subset of the first plurality of security attack data objects permissioned to be shared by the first entity based at least in part on the first access control list;
share the first subset of security attack data objects with respective entities based at least in part on the first access control list;
receive a second plurality of security attack data objects from a second entity, the second plurality of security attack objects comprising information regarding one or more security attacks detected by the second entity, each security attack data object from the second plurality of security attack data objects associated with a second access control list comprising indications of privacy of respective security attack data objects or indications of respective one or more entities permissioned to receive respective security attack data objects;
determine a second subset of the second plurality of security attack data objects permissioned to be shared by the second entity based at least in part on the second access control list;
share the second subset of security attack data objects with respective entities based at least in part on the second access control list;
receive a ruleset from a third entity, wherein the ruleset is generated by the third entity, the ruleset based at least in part on one or more shared security attack data objects from the first entity and one or more shared security attack data objects from the second entity, wherein the ruleset comprises code instructions executable by a plurality of entities to detect one or more security attacks, and wherein execution of the code instructions of the ruleset identifies malicious behavior of one or more security attacks, and wherein execution of the code instructions of the ruleset further accesses one or more third data objects associated with respective entities to identify the malicious behavior associated with respective entities, the one or more third data objects comprising at least one of IP address data, proxy data, user login data, malware data, virtual private network data, hostname data, data associated with computing device behavior, or network data, and wherein the ruleset is associated with a ruleset access control list, the ruleset access control list indicating respective one or more entities permissioned to receive the ruleset; and
share the ruleset with respective entities based at least in part on the ruleset access control list.

2. The system of claim 1, wherein the one or more computing devices is further programmed, via executable code instructions, to:
redact a portion of at least one security attack data object from the first plurality of security data objects such that the redacted portion is not detectable in the at least one security attack data object.

3. The system of claim 1, wherein the one or more computing devices is further programmed, via executable code instructions, to:
receive security attack data objects from respective entities; and
access weighting data associated with respective entities providing respective security attack data objects, wherein the weighting data is indicative of an expected accuracy of respective security attack data objects from respective entities.

4. The system of claim 3, wherein the weighting data of respective entities is determined based on usefulness of respective security attack data objects previously provided by the respective entities, and usefulness of security attack data objects is based on actual uses of the security attack data objects and/or a second ruleset based on the security attack data objects in detecting security attacks by other entities.

5. The system of claim 3, wherein the one or more computing devices is further programmed, via executable code instructions, to:
detect a pattern across security attack data objects from multiple entities, wherein a second ruleset indicates one or more attributes of the detected pattern that are usable by respective entities with which the second ruleset is shared in detecting similar security attacks.

6. The system of claim 2, wherein the redacted portion is determined based on redaction rules associated with the first entity.

7. The system of claim 1, wherein the one or more computing devices is further programmed, via executable code instructions, to:
generate user interface data associated with one or more security attacks detected by the ruleset for display to a user.

8. The system of claim 1, wherein an identity of the third entity is not included in the ruleset in response to preferences established by the third entity.

9. The system of claim 1, wherein an identity of the third entity is included in the ruleset in response to preferences established by the third entity.

10. The system of claim 1, wherein the ruleset includes one or more actions to reduce risk of security attacks similar to those of a first security attack associated with the first entity and a second security attack associated with the second entity.

11. The system of claim 1, wherein the one or more computing devices is further programmed, via executable code instructions, to:
redact a portion of the ruleset such that the redacted portion is not detectable in the ruleset.

12. The system of claim 1, wherein at least one shared security attack data object is associated with a network communication received by the first entity.

13. The system of claim 1, wherein the first access control list indicates that a respective security attack data object is shared with one or more entities within a vertical market.

14. The system of claim 1, wherein the first access control list indicates that a respective security attack data object is not shared with one or more entities within a vertical market or with particular entities.

15. Non-transitory computer storage comprising instructions for causing one or more computing devices to share security information by:
receiving security attack data from a first entity, the security attack data comprising information regarding one or more security attacks detected by the first entity, wherein an access control list is associated with at least a portion of the security attack data, the access control list indicating respective one or more entities permissioned to receive the portion of security attack data;
transmitting the portion of security attack data to respective one or more entities, wherein said transmitting of the portion of security attack data to respective one or more entities is in accordance with the access control list;
receiving a ruleset from a second entity, the ruleset based at least in part on the security attack data from the first entity, wherein the ruleset be comprises code instructions executable by a plurality of entities to detect one or more security attacks, and wherein execution of the code instructions of the ruleset identifies malicious behavior of one or more security attacks, and wherein execution of the code instructions of the ruleset accesses one or more data objects associated with respective entities to identify the malicious behavior associated with the respective entities, the one or more data objects comprising at least one of IP address data, proxy data, user login data, malware data, virtual private network data, hostname data, data associated with computing device behavior, or network data, and wherein the ruleset is associated with a ruleset access control list, the ruleset access control list indicating respective one or more entities permissioned to receive the ruleset; and
transmitting the ruleset to respective one or more entities, wherein said transmitting of the ruleset to respective one or more entities is in accordance with the ruleset access control list.

16. The non-transitory computer storage of claim 15, further comprising:
detecting a pattern across security attack data from multiple entities, wherein a second ruleset indicates one or more attributes of the detected pattern that are usable in detecting similar security attacks by respective one or more entities with which the second ruleset is transmitted.

17. The non-transitory computer storage of claim 15, further comprising:
redacting a portion of the ruleset from the second entity based on preferences of the second entity, such that the redacted portion is not detectable in the ruleset.

18. The non-transitory computer storage of claim 15, wherein the ruleset is further based at least in part on second security attack data associated with a third entity, and the ruleset is transmitted to a fourth entity.

19. A method for sharing security information comprising:
receiving a plurality of security attack data items from one or more entities, the plurality of security attack data items comprising information regarding one or more security attacks detected by respective entities, wherein an access control list is associated with each security attack data item from the plurality of security attack data items, the access control list associated with a respective security attack data item indicating that respective one or more entities permissioned to receive the respective security attack data item;
generating a ruleset based on at least one security attack data item from the plurality of security attack data items, wherein the ruleset comprises code instructions executable by a plurality of the entities to detect one or more security attacks, and wherein execution of the code instructions of the ruleset identifies malicious behavior of one or more security attacks, and wherein execution of the code instructions of the ruleset accesses one or more data objects associated with respective entities to identify the malicious behavior associated with the respective entities, the one or more data objects comprising at least one of IP address data, proxy data, user login data, malware data, virtual private network data, hostname data, data associated with computing device behavior, or network data;
transmitting at least one security attack data item from the plurality of security attack data items to respective one or more entities based at least in part on respective access control lists; and
transmitting the ruleset to one or more entities.

20. The method of claim 19, further comprising:
redacting configurable portions of the ruleset such that the redacted portions are not detectable in the ruleset.

\* \* \* \* \*